United States Patent [19]
Suzuki

[11] Patent Number: 5,828,777
[45] Date of Patent: Oct. 27, 1998

[54] IMAGE PROCESSING METHOD AND APPARATUS FOR PREVENTING COPING OF SPECIFIED DOCUMENTS

[75] Inventor: Akio Suzuki, Tokyo, Japan

[73] Assignee: Canon Kabushiki Kaisha, Tokyo, Japan

[21] Appl. No.: 440,318

[22] Filed: May 12, 1995

Related U.S. Application Data

[63] Continuation of Ser. No. 22,626, Feb. 25, 1993, abandoned.

[30] Foreign Application Priority Data

Feb. 28, 1992 [JP] Japan .................................. 4-043893

[51] Int. Cl.$^6$ .................................................. G06K 9/68
[52] U.S. Cl. ........................ 382/135; 382/227; 382/165; 358/515; 355/201
[58] Field of Search ........................... 355/201; 382/135, 382/137, 165, 191, 227, 309, 310; 358/504, 515, 518, 522

[56] References Cited

U.S. PATENT DOCUMENTS

| | | | |
|---|---|---|---|
| 4,466,122 | 8/1984 | Auerbach | 382/17 |
| 4,991,223 | 2/1991 | Bradley | 382/17 |
| 5,216,724 | 6/1993 | Suzuki et al. | 382/7 |
| 5,227,871 | 7/1993 | Funada et al. | 382/7 |
| 5,257,119 | 10/1993 | Funada et al. | 358/438 |
| 5,257,323 | 10/1993 | Melen et al. | 382/310 |
| 5,321,470 | 6/1994 | Hasuo et al. | 355/201 |
| 5,363,202 | 11/1994 | Udagawa et al. | 358/501 |
| 5,363,454 | 11/1994 | Udagawa et al. | 382/17 |

FOREIGN PATENT DOCUMENTS

| | | | |
|---|---|---|---|
| 0342060 | 11/1989 | European Pat. Off. | G03G 21/00 |
| 0488796 | 6/1992 | European Pat. Off. | G03G 21/00 |
| 512411 | 1/1993 | Japan | G06F 15/62 |

*Primary Examiner*—Leo Boudreau
*Assistant Examiner*—Christopher S. Kelley
*Attorney, Agent, or Firm*—Fitzpatrick, Cella, Harper & Scinto

[57] ABSTRACT

An image processing apparatus for performing accurate discrimination between specific originals and ordinary originals. CCD 101 inputs RGB signals, and color-space matching judgment circuit 106 and pattern matching judgment circuit 113 judge the similarity in the color distribution and pattern between the input RGB data and a predetermined specific image data. CPU 114 judges the similarity and print-signal generator 105 generates a change signal in accordance with the judged similarity. The input RGB signals are changed based on the generated change signal and outputted to external color printer 111.

34 Claims, 19 Drawing Sheets

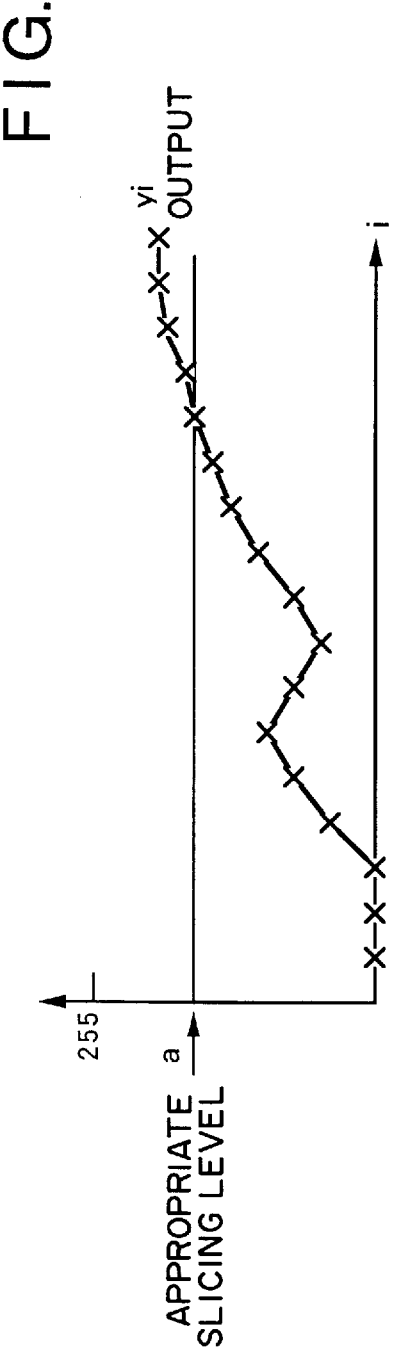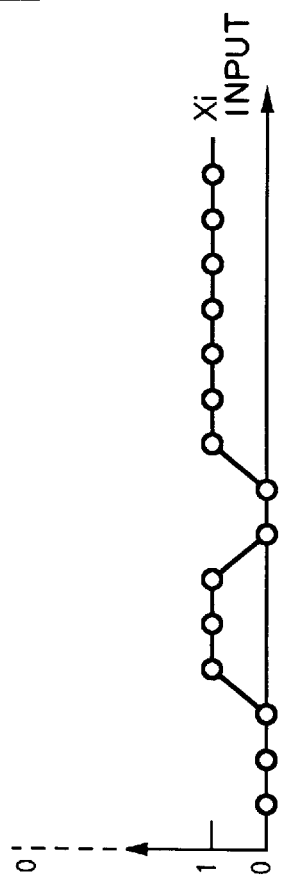

$E = |A+2B+C-G-2H-I| + |A+2D+G-C-2F-I|$ (Sobel OPERATOR)

IMAGE PROCESSING METHOD AND APPARATUS FOR PREVENTING COPING OF SPECIFIED DOCUMENTS

This application is a continuation of application Ser. No. 08/022,626 filed Feb. 25, 1993, now abandoned.

BACKGROUND OF THE INVENTION

The present invention relates to an image processing method and apparatus, e.g., to an image processing method and apparatus having a function for discriminating a specific original.

Related Arts

In recent years, the reproductivity of an original has improved along with the development of copying machines. For this reason, technique for preventing copying originals which should not be copied such as bank notes and securities is needed. As one of such technique, the applicant of the present invention has proposed, U.S. Ser. No. 715,922 filed Jun. 14, 1991, now U.S. Pat. No. 5,122,165 discrimination of specific originals by pre-registering data of specific originals in color-space and judging whether or not the distribution of the input original image data in color-space approximately coincides with the distribution of specific original data. In addition, as a state of this art, technique of performing the above discrimination by predetermined area of an input image has been proposed as Japanese Patent Application No. 3-160385.

However, originals which are difficult to discriminate, by using the above conventional techniques only, whether they are specific originals or ordinary originals have been increased.

SUMMARY OF THE INVENTION

The present invention has been made in view of the drawback of the aforementioned prior arts, and has as its object to provide an image processing method and apparatus for performing accurate discrimination between specific originals and ordinary originals.

Another object of the present invention is to provide an image processing method and apparatus for performing better discrimination by employing at least two discriminating methods.

Further object of the present invention is to provide an image processing method and apparatus for reducing discrimination process and performing accurate discrimination.

Another object of the present invention is to provide an image processing method and apparatus for changing only the part of an input original similar to a pre-registered specific original.

Other features and advantages of the present invention will be apparent from the following description taken in conjunction with the accompanying drawing, in which like reference characters designate the same or similar parts throughout the figures thereof.

BRIEF DESCRIPTION OF THE DRAWINGS

The accompanying drawing, which are incorporated in and constitute a part of the specification, illustrate embodiments of the invention and, together with the description, serve to explain the principles of the invention.

FIGS. 8A and 8B are diagrams showing the relation between input Xi and smoothed value Yi in the first embodiment;

DETAILED DESCRIPTION OF THE PREFERRED EMBODIMENT(S)

Preferred embodiments of the present invention will be described in detail with reference to the attached drawings.

First Embodiment

Signal Process Block Diagram

Figure 1:
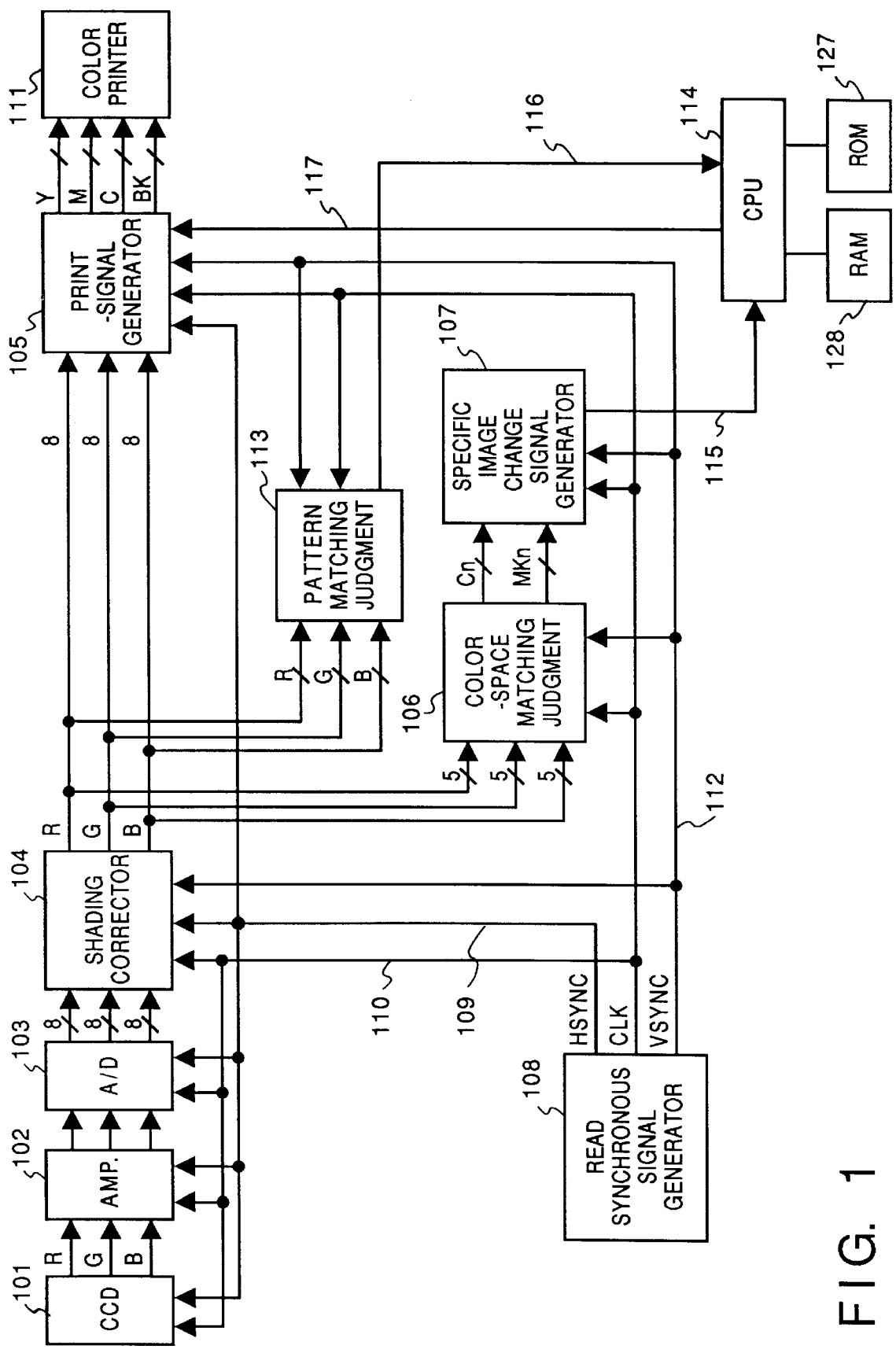
FIG. 1 is a block diagram showing the configuration of a color image reading apparatus according to the first embodiment of the present invention.

FIG. 1 is a block diagram showing the configuration of a color image reading apparatus according to a first embodiment of the present invention. The color image reading apparatus in FIG. 1 is connected to a color printer 111.

Figure 10:
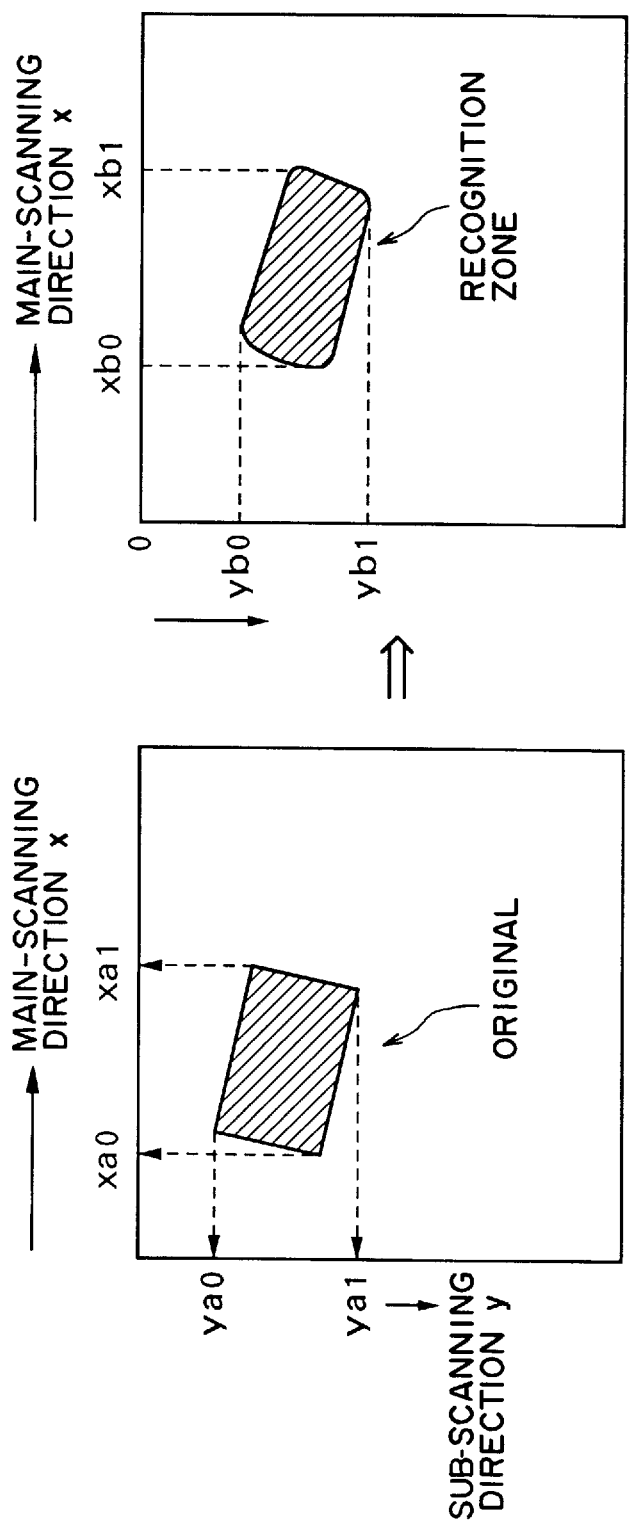
FIG. 10 is a diagram showing the relation between the position of a specific original on a platen and its recognition zone.

In FIG. 1, reference numeral 101 denotes a CCD color sensor comprising an R (Red), G (Green) and B (Blue) CCD line sensor; 102, an analog amplifier; 103, an A/D converter; 104, a shading corrector for correcting uneven brightness of an image signal due to the reading position of image; and 106, a color-space matching judgment circuit for calculating the similarity in color-distribution in RGB color-space between the read image data and specific originals such as a bank note and a security. By using a color signal after shading correction by the shading corrector 104, the distortion of brightness and color due to the position of original is corrected and similarity judgment in the color-space can be accurately performed regardless of the placing position of an input original. FIG. 10 shows the relation between the position of a specific original on a platen and its recognition zone. In FIG. 10, if the position of the specific original on the platen is xa0–xa1 in the main scanning direction and ya0–ya1 in the subscanning direction, its recognition zone takes xb0–xb1 in the main scanning direction and yb0–yb1 in the subscanning direction.

Numeral 105 denotes a print signal generator for converting color signals R, G, and B read by the color sensor 101 into Y (yellow), M (magenta), C (cyan) and Bk (black) signals. This circuit modifies a print signal by a change signal 117 from a CPU 114. Numeral 107 denotes a specific image change signal generator for generating a specific image change signal 115; 108, a read synchronous signal generator for generating read synchronous signals HSYNC 109, CLK 110 and VSYNC 112; 109, a main-scanning interval signal (VSYNC); 110, a pixel reading basic block signal (CLK); and 112, an interval signal (VSYNC) indicating reading effective zone in the subscanning direction.

Numeral 113 denotes a pattern matching judgment circuit for calculating the similarity between a pattern included in a read image data and a pattern such as a bank note and a security included in a specific original; 114, a CPU for controlling the overall reading apparatus; 127, a ROM in which programs for operations of the CPU 114 are stored; and 128, a RAM used as a work area for various programs.

Color-Space Matching Judgment Circuit 106

Figure 2:
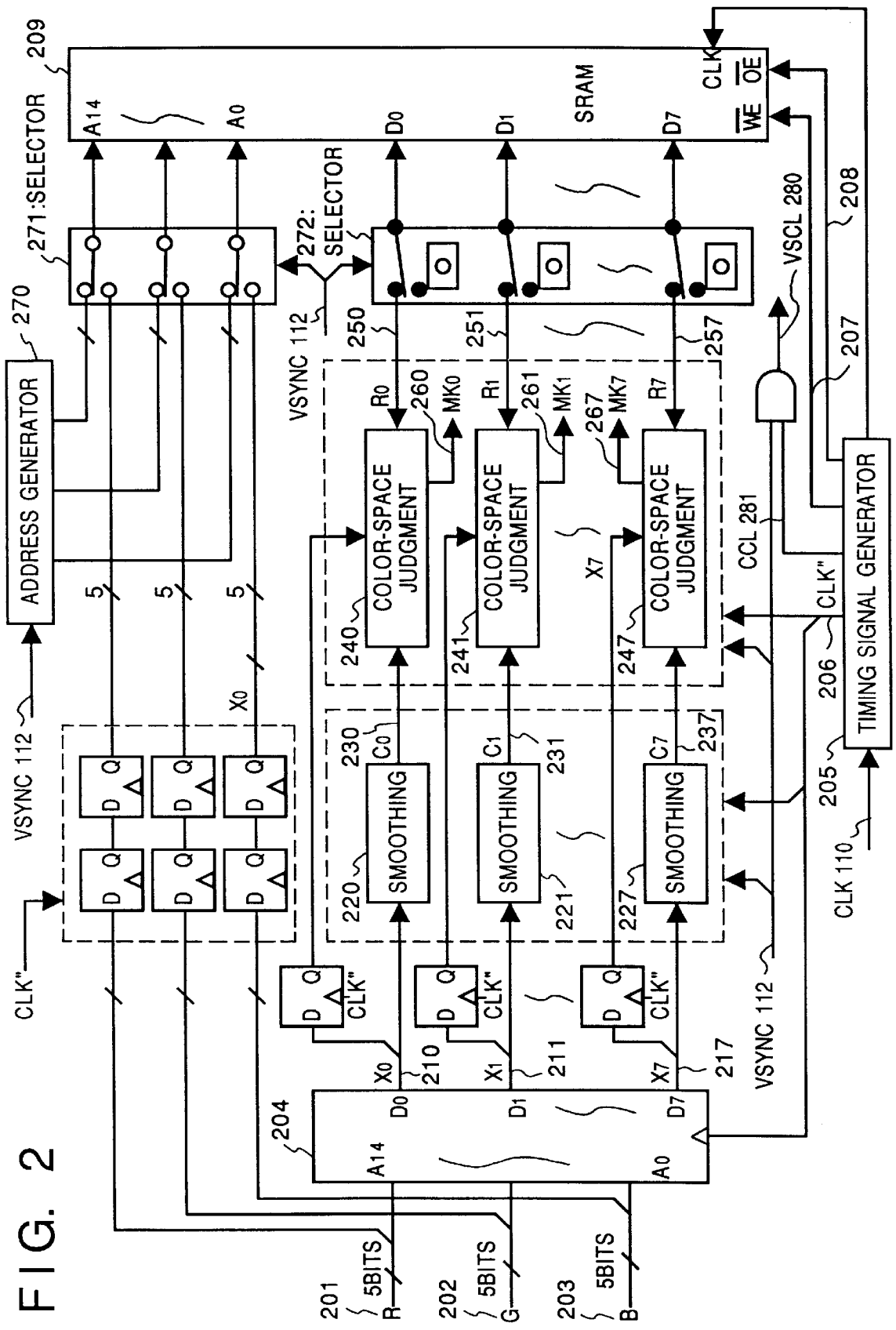
FIG. 2 is a block diagram showing the configuration of a color-space matching judgment circuit 106 according to the first embodiment.
Figure 9:
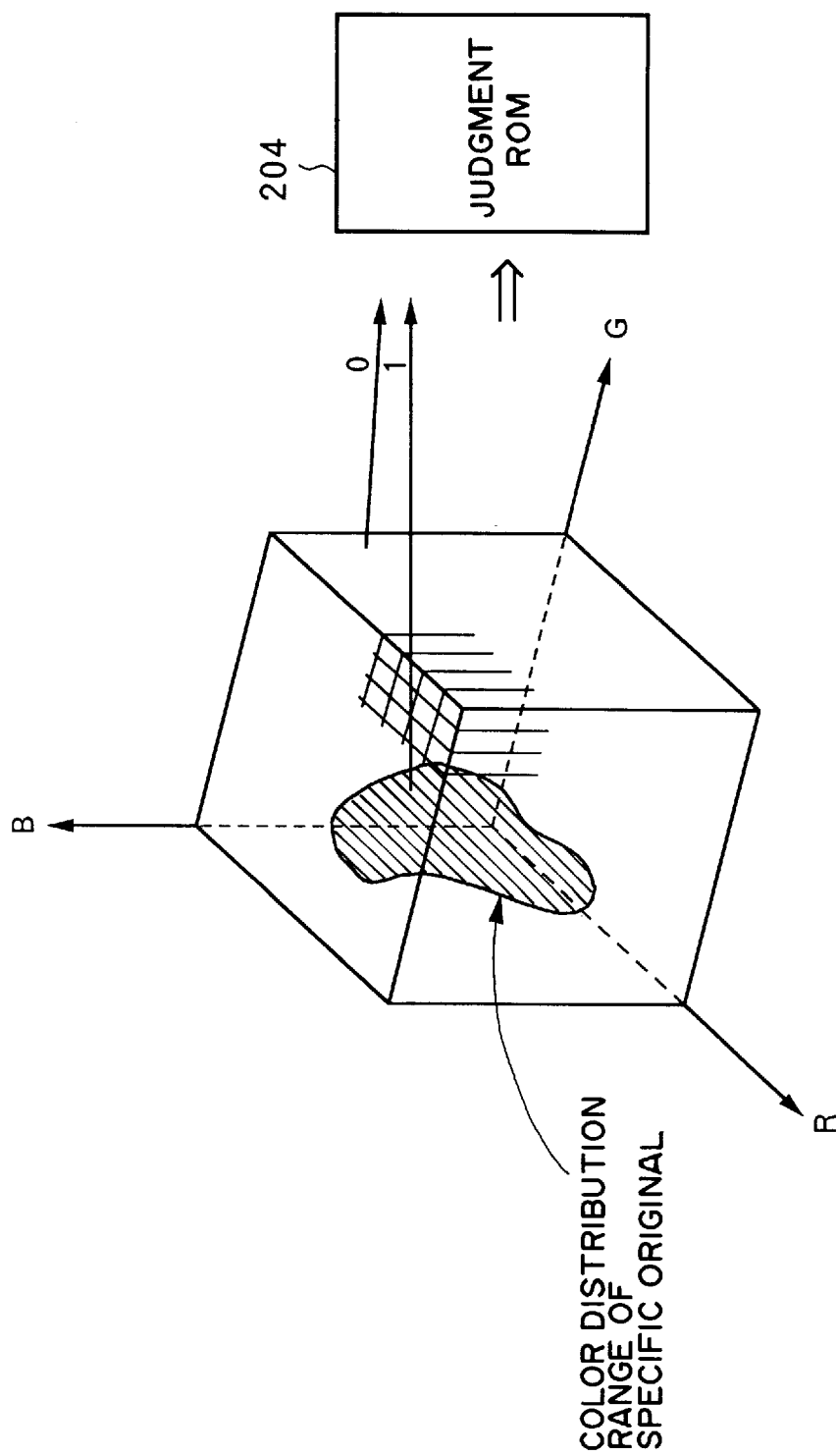
FIG. 9 is a diagram showing the relation between the shape of data obtained from a specific original in the color-space and data in a ROM in the first embodiment.

FIG. 2 is a block diagram showing the configuration of the color-space matching judgment circuit 106 according to the first embodiment. FIG. 9 is a diagram showing a ROM 204 in the first embodiment for storing a set of input RGB signals and one-bit of a judgment signal, and the color distribution formed from a specific original in the RGB three-dimensional color-space ($\epsilon$ distribution).

In FIG. 2, reference numeral 201 denotes the upper five-bit data of an eight-bit R signal from the shading corrector 104. Similarly, numeral 202 denotes the five-bit G signal; and 203, the five-bit B signal. Color information on plural kinds (eight kinds) of specific originals is pre-stored in the ROM 204. More specifically, eight kinds of color distributions, one of which is as shown in FIG. 9, are stored in one ROM. Each type of the specific original stored as data in the ROM 204 is hereinafter referred to as a "prohibited master". The R, G and B signals are inputted in addresses A0–A14, and judgment signals (one-bit × eight kinds) indicating whether or not the input R, G and B signals coincide with corresponding colors of the plural kinds of prohibited masters are outputted from determined D0–D7 as data R0–R7.

Figure 4:
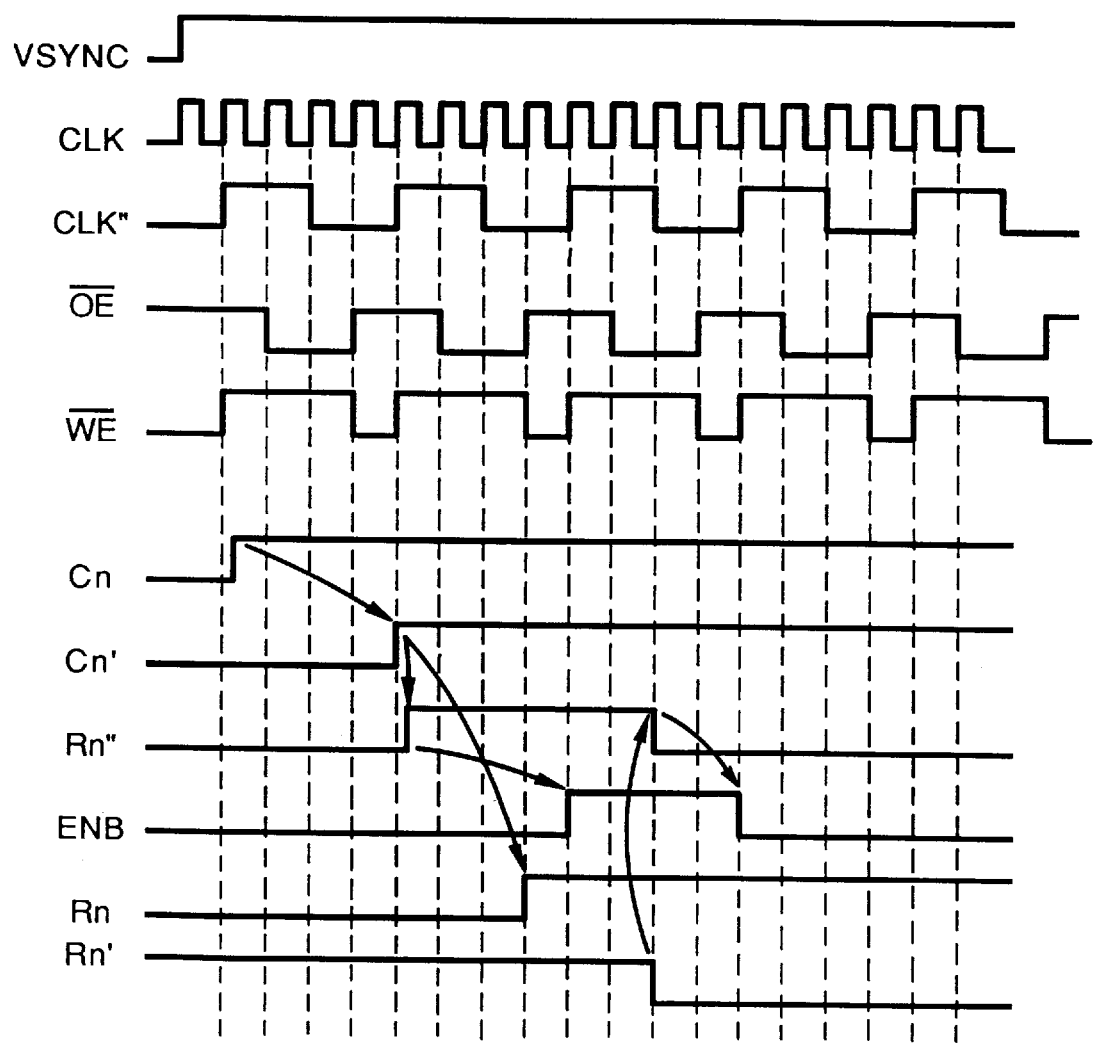
FIG. 4 is a timing diagram showing the relation between reading and writing of data from/to a SRAM 209 in the first embodiment.

Numeral 205 denotes a timing signal generator for generating timing signals as shown in FIG. 4; 206, a clock signal (CLK") obtained by dividing the basic clock CLK 110 by four; 207, a signal for controlling a writing allowance terminal in a SRAM 209; 208, a signal for controlling an output allowance terminal in the SRAM 209.

The color information of the respective eight kinds of prohibited masters, one of which is as shown in FIG. 9, is stored in data in the ROM 204. In case of coincidence with the color of a prohibited master, "1", if not, "0" is outputted to each of output terminals D0–D7 as color judgment signals X0–X7. The X0–X7 correspond to the eight kinds of 0th–7th prohibited masters A through H.

Numerals 271 and 272 denote selectors; 209, the SRAM; 270, an address generator; 220–227, smoothing circuits; 240–247, color-space judgment circuits.

Figure 11:
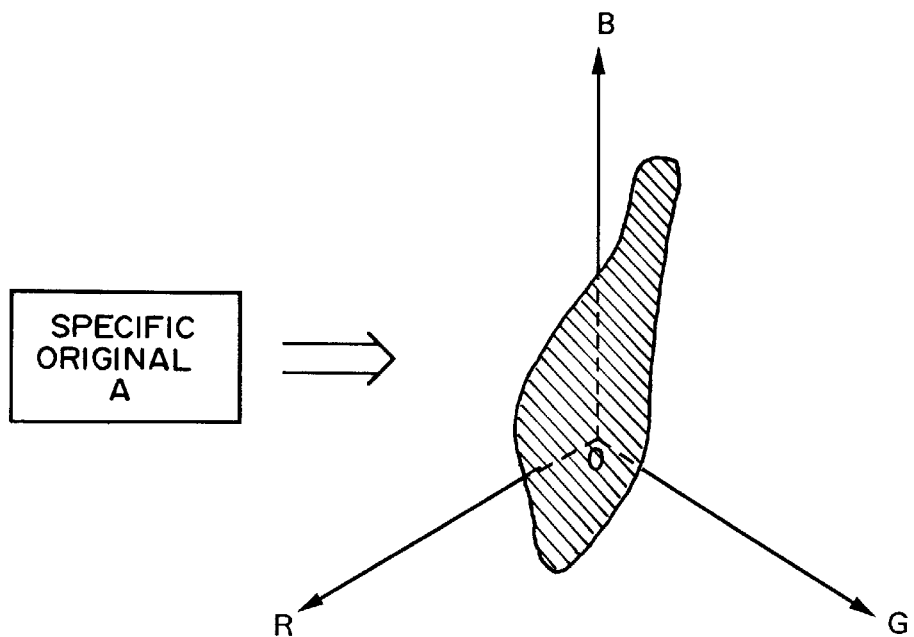
FIG. 11 is a diagram showing the distribution of data obtained from a specific original A in the RGB three-dimensional space in the first embodiment.
Figure 12:
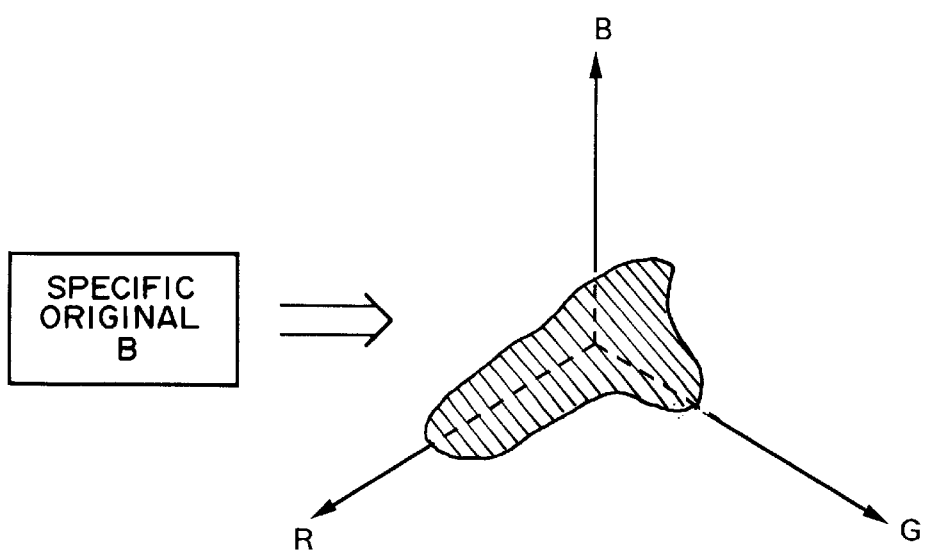
FIG. 12 is a diagram showing the distribution of data obtained from a specific original B in the RGB three-dimensional color-space in the first embodiment.
Figure 13:
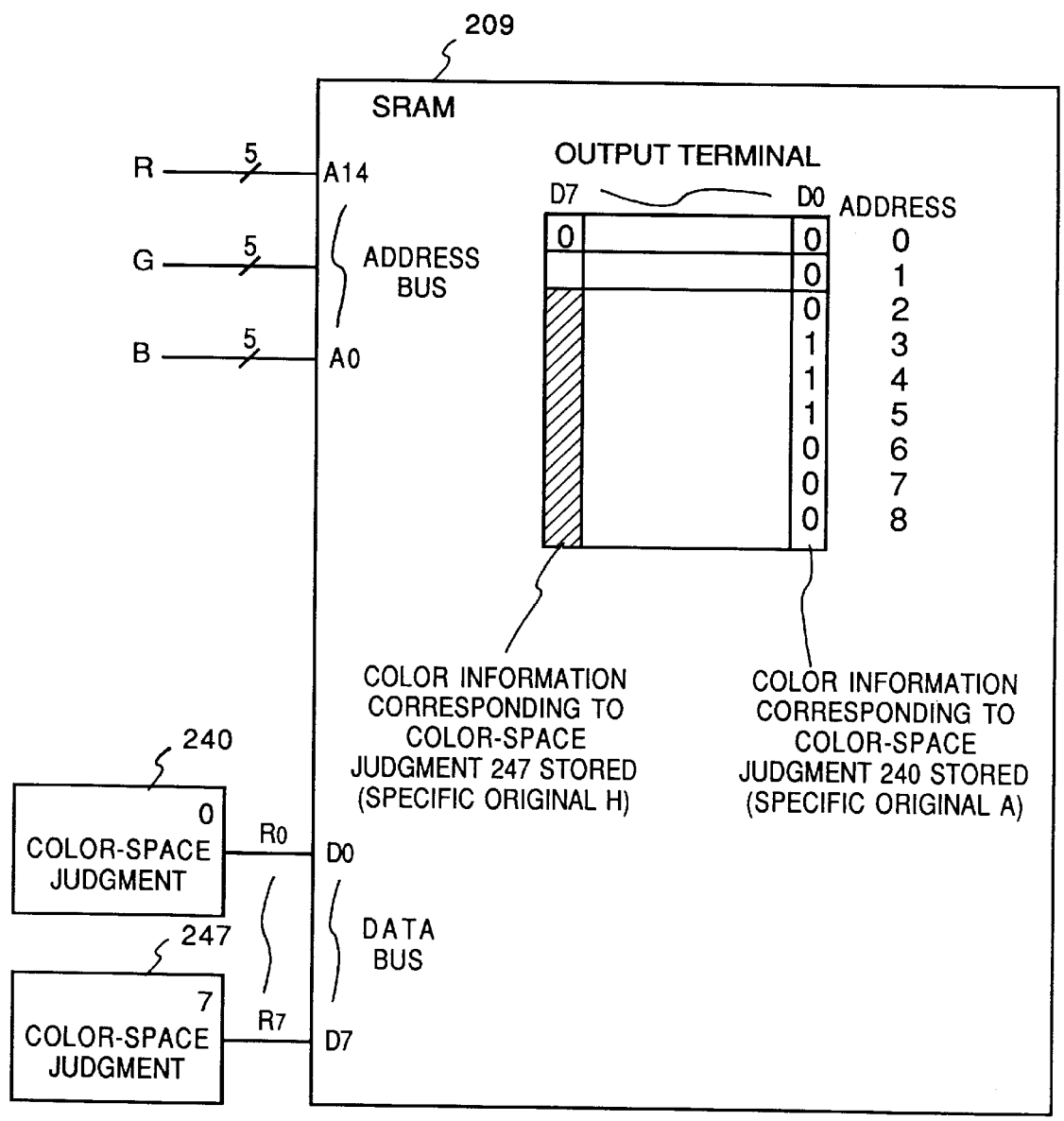
FIG. 13 is a diagram showing the relation between data relating to colors obtained from the plurality of originals A–H stored in the ROM 204 and bit positions in the ROM 204 in the first embodiment.

FIG. 11 is a diagram showing RGB three-dimensional color-space distribution of a prohibited master A used in the first embodiment. FIG. 12 shows RGB three-dimensional color-space distribution of a prohibited master B. FIG. 13 shows the data on the relation between colors of the plural originals A–H and the color of an original on the platen stored in the SRAM 209 and bit positions in the SRAM 209.

As shown in FIGS. 11–13, the output terminals D0–D7 output, in parallel, judgment informations R0–R7 (signal lines 250–257) regarding the colors of eight kinds of different prohibited masters for comparison with the input pixel data.

Figure 7:
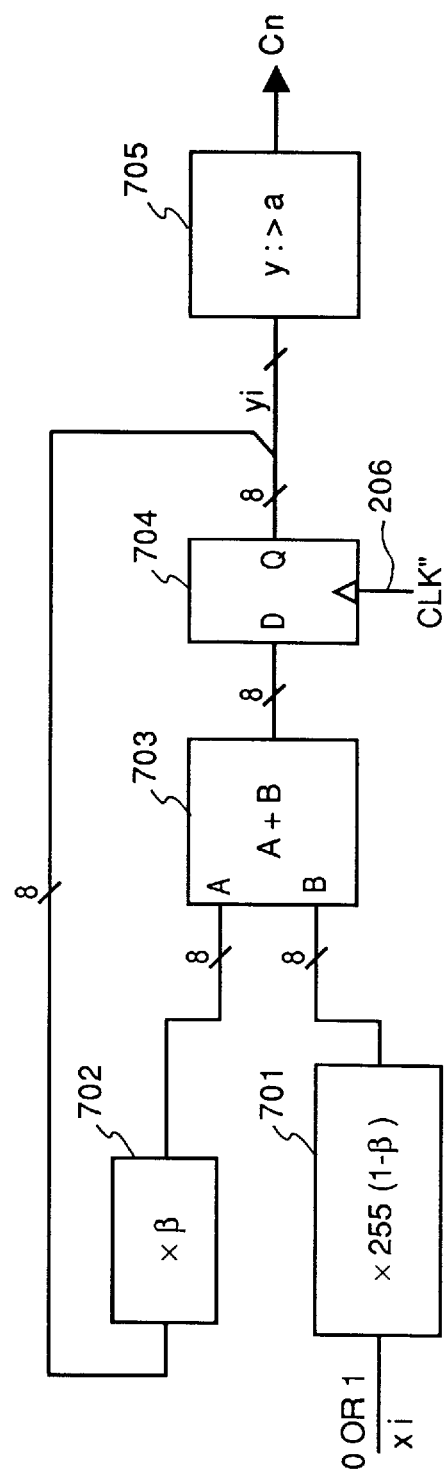
FIG. 7 is a block diagram showing the configuration of the smoothing circuits 220–227 according to the first embodiment.

The smoothing circuits 220–227 perform smoothing calculation as shown in FIGS. 7 and 8 using color judgment signals X0 210–X7 217.

FIG. 7 is a block diagram showing the configuration of the smoothing circuits 220–227 according to the first embodiment. In FIG. 7, reference numeral 701 and 702 denote multipliers; 703, an adder; 704, a latch; and 705, a comparator.

In the construction as described above, judgment, in consideration of continuity as shown in FIGS. 8A and 8B to be described later, is possible by the weighted averaging of input data and previous data by the multipliers 701 and 702 and the adder 703.

FIGS. 8A and 8B show the relation between input Xi and a smoothed value Yi. If the value "1" of input Xi continues (FIG. 8A), the value of Yi increases (FIG. 8B). As shown in FIGS. 8A and 8B, if input R, G and B signals continuously coincide with the color of a prohibited master, signals C0 230–C7 237 become "1" (plural "1"s may be possible) and more precise judgment can be made without being influenced by such factor as a noise.

Figure 14:
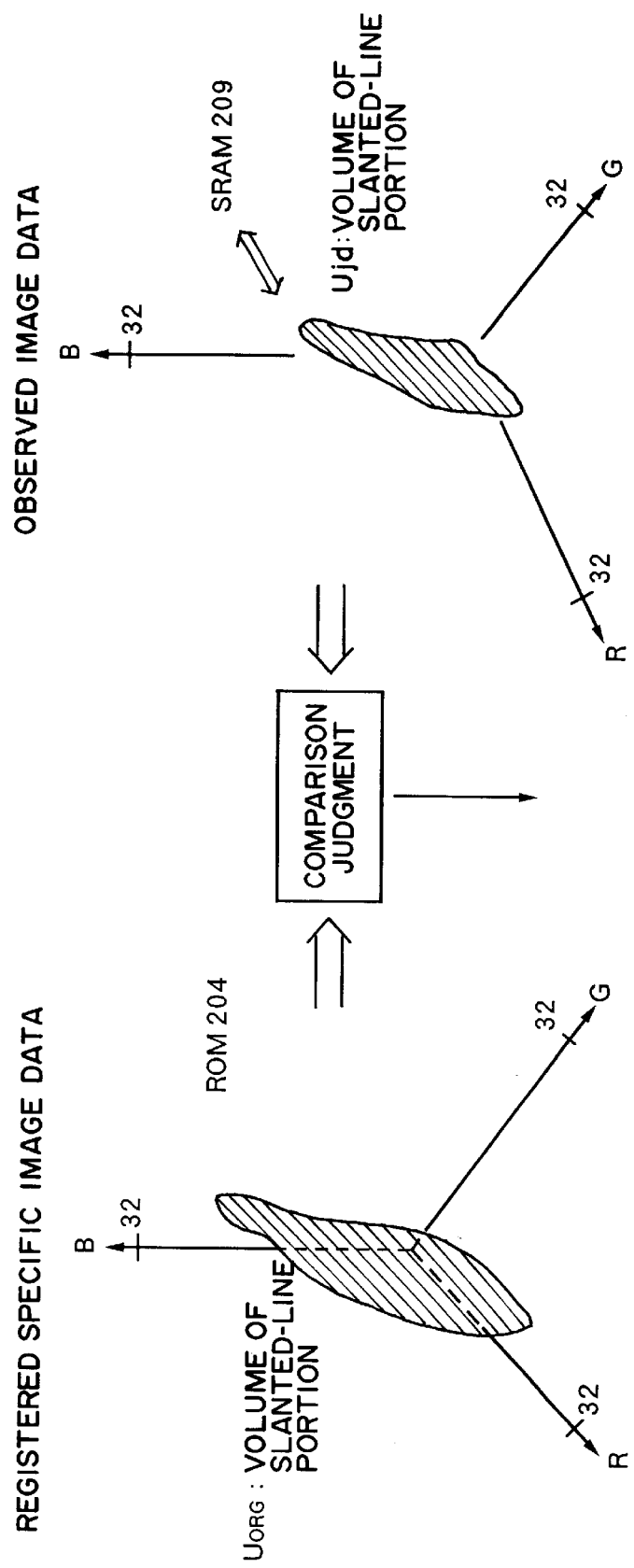
FIG. 14 is a conceptualized view showing the comparison between image data obtained from specific original and input original image data in the three-dimensional color-space in the first embodiment.

FIG. 14 is a conceptualized view showing the similarity judgment between a specific image data and an input color image data in color distribution in the three-dimensional color-space in the first embodiment.

The color-space judgment circuits 240–247 calculate the similarity between the specific image data and the input color signal in the RGB color-space as shown in FIG. 14 and generate color-space similarity judgment signals MK0 260–MK7 267.

Figure 3:
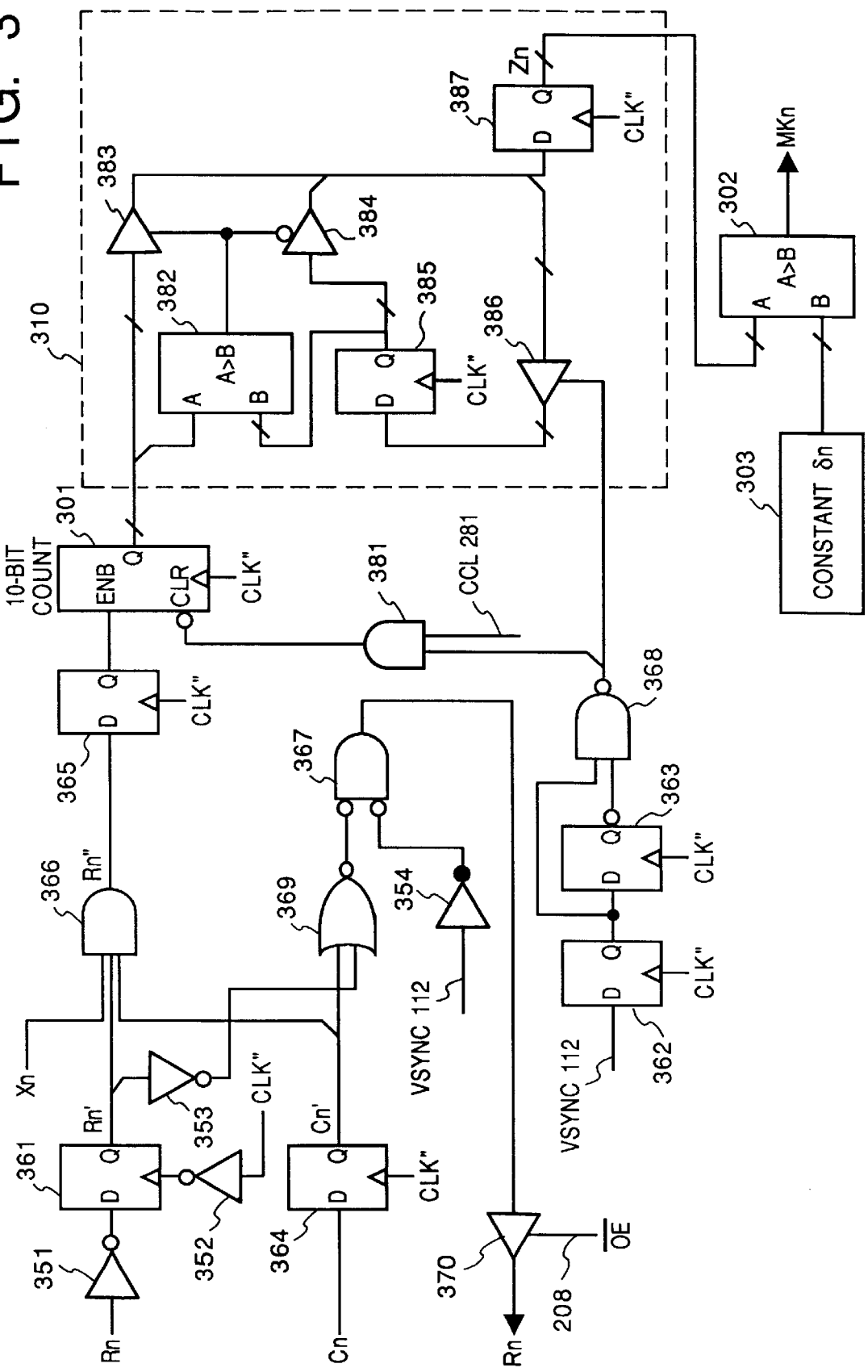
FIG. 3 is a logic diagram showing the configuration of a color-space judgment circuit according to the first embodiment.

FIG. 3 is a block diagram showing the configuration of the color-space matching judgment circuit according to the first embodiment. In FIG. 3, numeral 301 denotes a 10-bit counter; 302 and 382, comparators; 303, a register; 351–354, inverters; 361–365, 385 and 387, D-flip-flops; 366 and 381, AND gates; 367 and 368, NAND gates; 369, a NOR gate; 370, 383, 384 and 386, buffers; and 310, a latch.

Next, the operations by the above construction will be described below.

Figure 15:
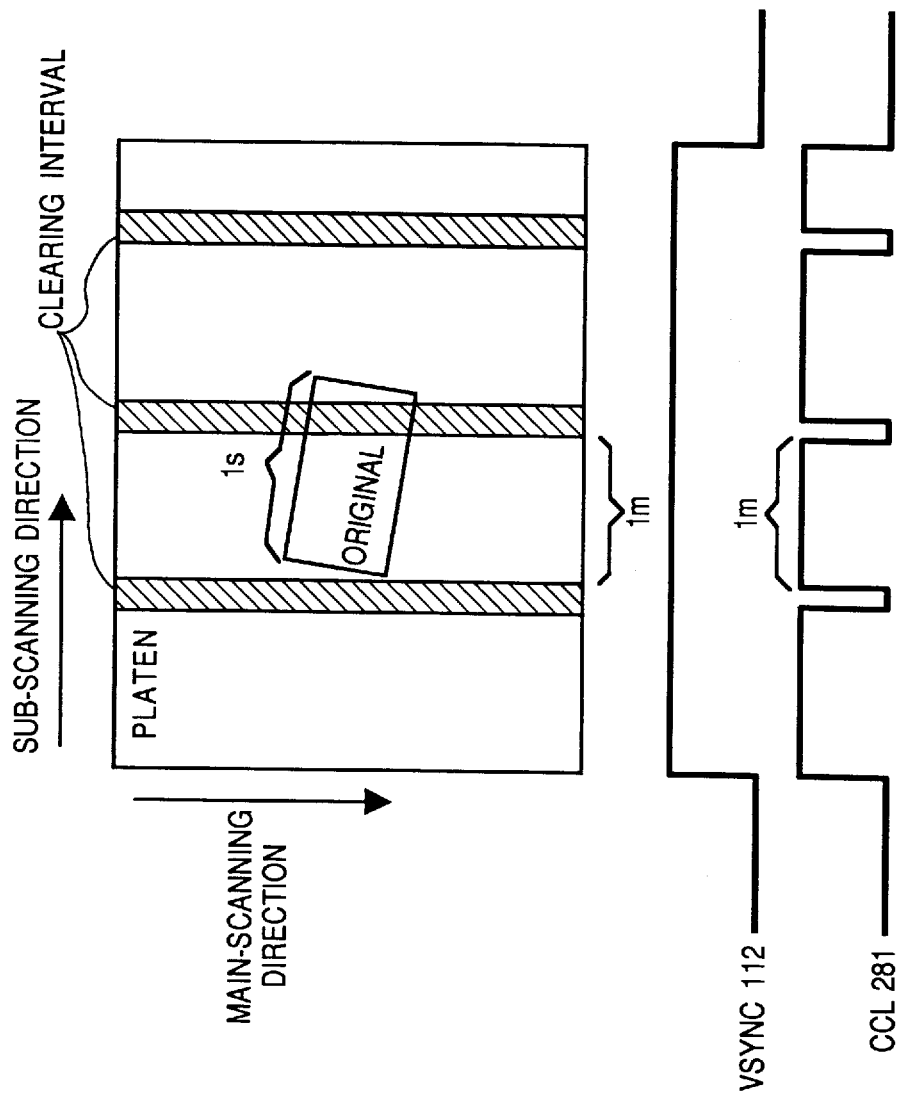
FIG. 15 is a diagram showing the relation between a color-space matching process area signal CCL 281 and partitioned areas on the platen in the first embodiment.

FIG. 15 is a diagram showing the relation between a color-space matching process area signal CCL 281 and partitioned areas on the platen.

Data Rn from the SRAM 209 is ORed with a signal Cn from the smoothing circuit and written into the SRAM 209. Only when the data Rn changes from "0" to "1", the counter 301 becomes count enable (ENB) and is incremented by one. This counter is cleared at rising of the subscanning interval signal VS 112 or at a lower interval of the CCL 281. The latch 310 is a circuit for latching the maximum value of output values from the counter 301. The comparator 302 compares a constant δn with the output maximum value Zn from the 10-bit counter 301. If Zn>δn, MKn=1; if Zn≦δn, MKn=0. The value of δn is set as 1% of UORG in FIG. 14, as expressed by:

$$\delta n = U_{ORG}/100 \qquad (1)$$

In FIG. 14, $U_{ORG}$ is a numerical value having as its unit volume a cube obtained by dividing the RGB coordinate axes by 32. It is set so that the value of the judgment signal MKn may become "1" if the original placed on the platen is equal to or greater than 50%. The CCL 281 is a signal indicating an area to which color-space matching process is performed. The CCL 281 is generated by the timing signal generator 205 at timing shown in FIG. 15 so as to satisfy the following expression:

$$Ls \geq Lm \geq (Ls/2) \qquad (2)$$

In the expression (2), Ls indicates the length of the original and Lm indicates an interval distance when the CCL 281 is "1".

The selectors 271 and 272 are for clearing the SRAM 209 to "0" when the subscanning interval signal VSYNC 112 is "0" (LOW) or the CCL 281 is "0" (LOW). The address generator 270 sequentially generates all the addresses of the SRAM 209. When the VSCL 280 is LOW, the SRAM 209 is cleared to "0" in accordance with the address signals generated by the address generator 270.

By the above process, when observed image data within a fixed interval area, i.e., data distribution of input color signal row within the fixed interval area approximately coincide with data distribution of a prohibited master in the RGB three-dimensional color-space, the color-space similarity judgment signal MK0. 260–MK7 267 are set to "1".

The reading/writing of data from/to the SRAM 209 is as shown in FIG. 4.

Specific Image Change Signal Generator 107

Figure 5:
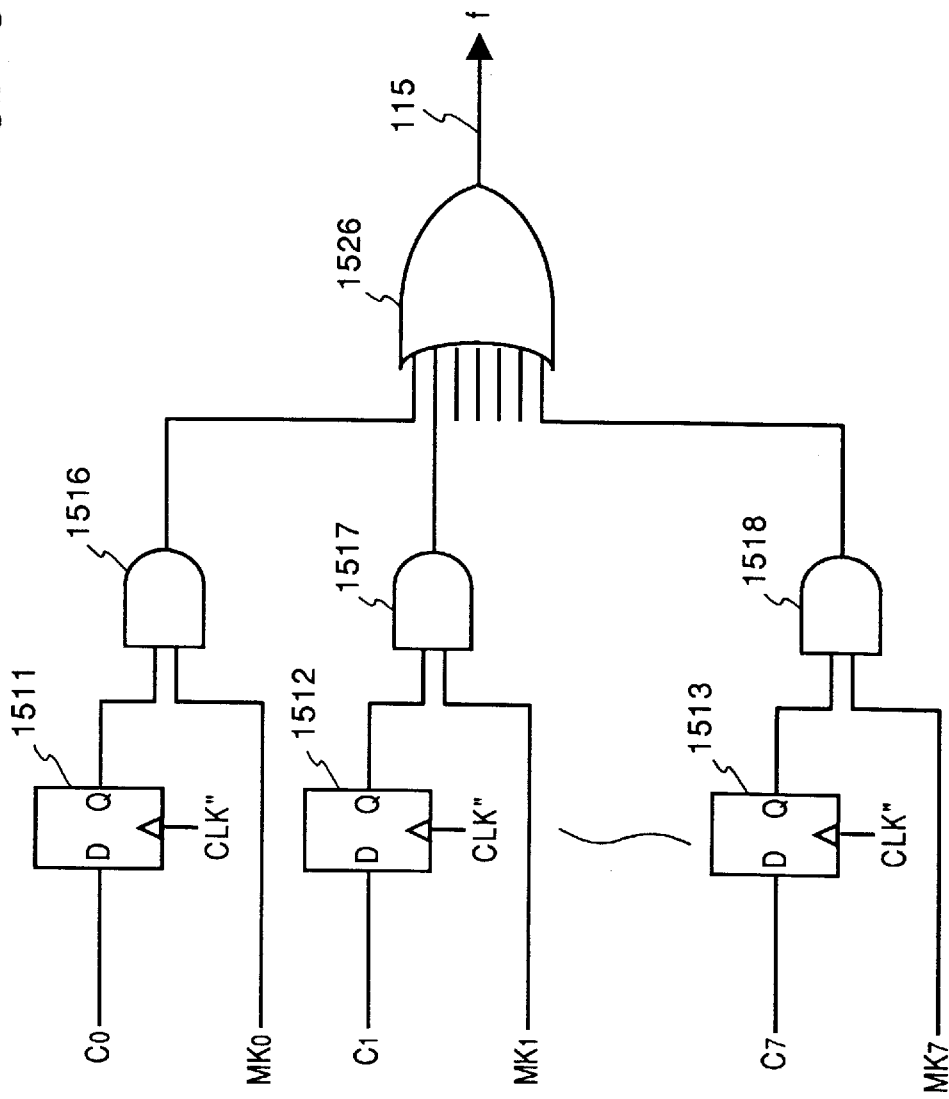
FIG. 5 is a logic diagram showing the configuration of a specific image change signal generator 107 according to the first embodiment.

FIG. 5 is a block diagram showing the configuration of the specific image change signal generator 107 according to the first embodiment. In FIG. 5, numeral 115 denotes a signal line; 1511–1513, D-flip-flops; 1516–1518, AND gates; and 1526, an OR gate.

By the above construction, the specific image change signal 115 is set to "1" (HIGH) if any one of the plurality of prohibited master data registered in the ROM 204 is judged to coincide with the observed image data in the color-space.

Pattern Matching Judgment Circuit 113

Figure 16:
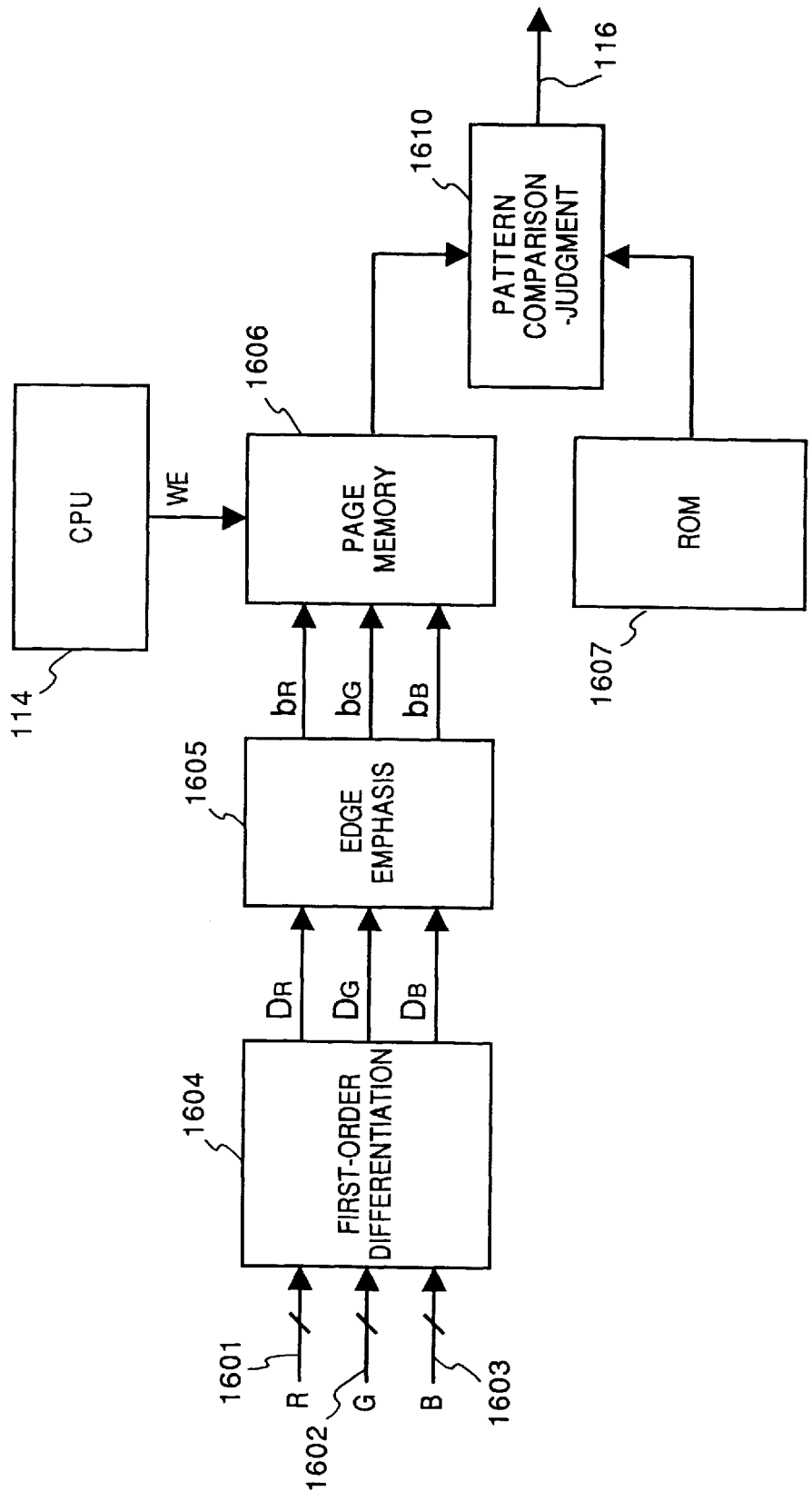
FIG. 16 is a block diagram showing the configuration of a pattern matching judgment circuit 113 according to the first embodiment.

FIG. 16 is a block diagram showing the configuration of the pattern matching judgment circuit 113 according to the first embodiment. In FIG. 16, numeral 1604 denotes a first-order differentiation circuit; 1605, an edge emphasis circuit; 1606, a page memory; 1607; a ROM; and 1610, a pattern comparison-judgment circuit.

Next, the operations will be described.

Figure 17:
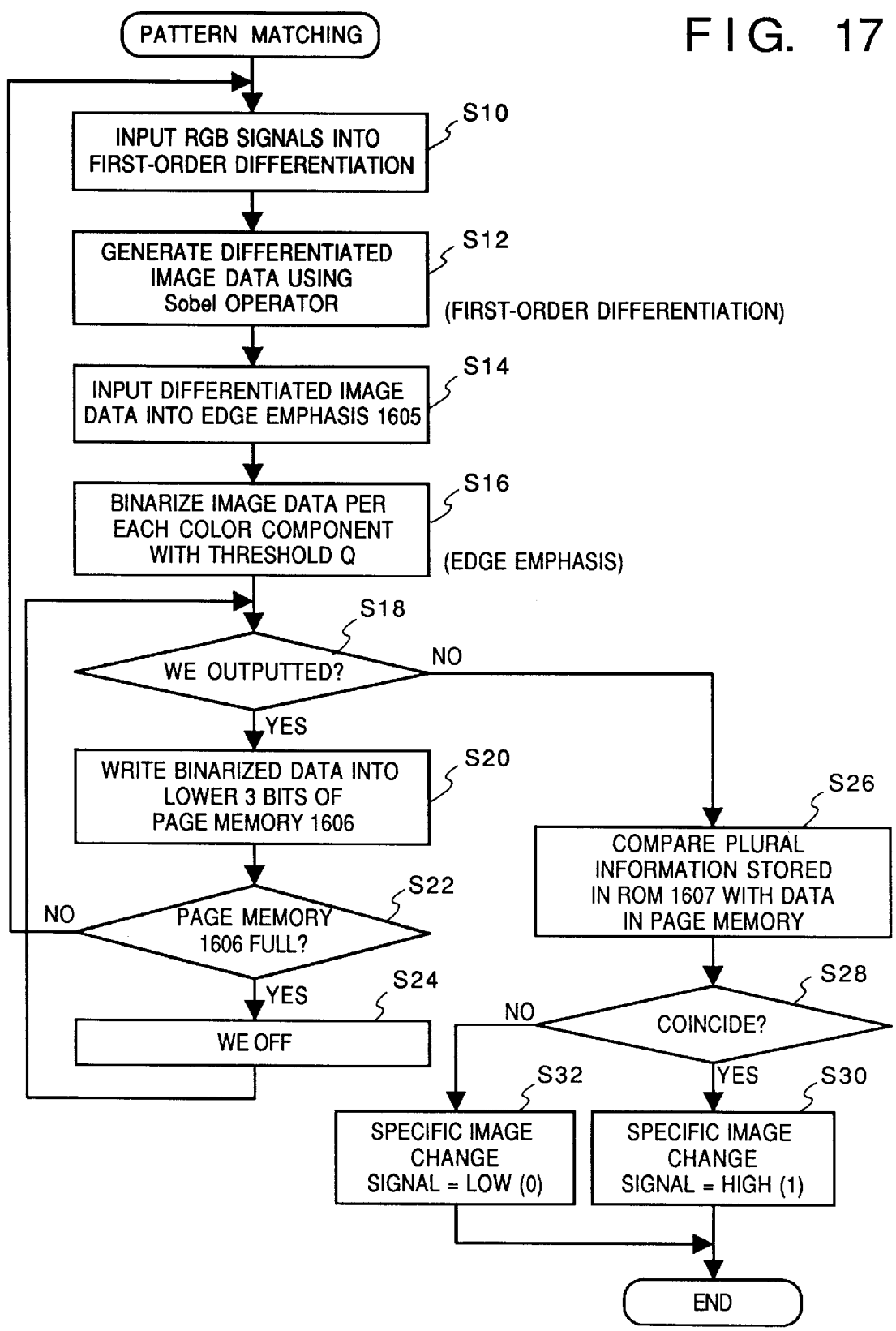
FIG. 17 is a flowchart explaining pattern matching operation according to the first embodiment.
Figures 18, 19:
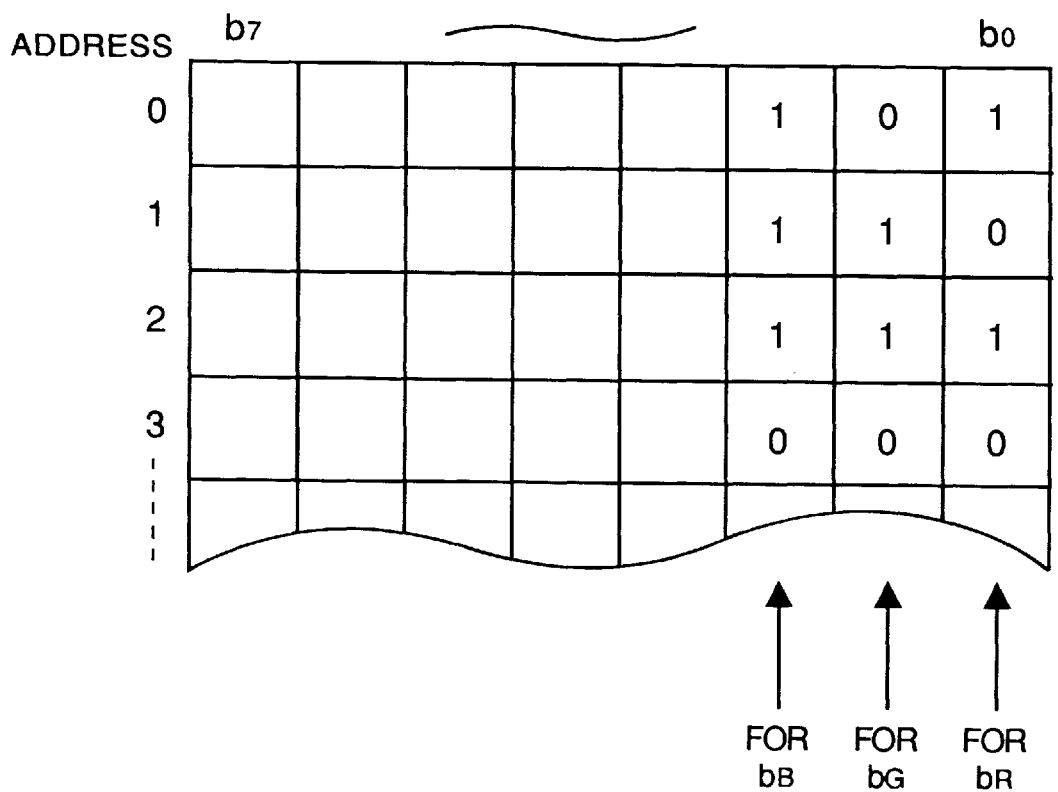
FIG. 18 is a diagram showing a Sobel operator used in a first-order differentiation circuit.
FIG. 19 is a diagram showing a data format for writing data into a page memory in the first embodiment.

FIG. 17 is a flowchart explaining pattern matching operation according to the first embodiment. FIG. 18 is a diagram explaining an operator of Sobel used in the first-order differentiation circuit. FIG. 19 is a diagram explaining data format with which data is written into the page memory in the first embodiment.

First, R, G and B eight-bit signals as outputs from the shading corrector 104 are inputted into the first-order differentiation circuit 1604 (step S10). The first-order differentiation circuit 1604 generates differentiated image data $D_R$, $D_G$ and $D_B$ per each of R, G and B color components using a Sobel operator as shown in FIG. 18 (step S12). These differentiated image data are inputted into the edge emphasis circuit 1605 (step S14), the image density is converted (binarized) to "0" or "1" per each color component in accordance with the expression (3) with an appropriate threshold value θ as the border in the circuit (step S16). These values are written into the page memory 1606 in the format shown in FIG. 19 by a writing allowance signal WE from the CPU 114 (steps S18 and S20). The expression for this operation is as follows:

$$f'(x,y)=1 \text{ (if } f(x,y) \geq 0) \text{ or } 0 \text{ (if } f(x,y)<\theta) \qquad (3)$$

The expression (3) is for edge-emphasizing lower three-bits of data to be written into each address and for writing data binarized per each color component. This process is repeated till the page memory 1606 becomes full (step S22), and when it becomes full, the writing allowance signal WE from the CPU 114 becomes LOW (step S24). The data relating to forms of the plurality of prohibited masters stored in the ROM 1607 in the format shown in FIG. 19 and the data in the page memory 1606 are compared (steps S18 and S26). By this comparison, if even a part of the data in the page memory 1606 coincides with the data relating to the forms of the prohibited masters (step S28), a specific image detection signal 116 outputted to the CPU 114 is set to "1" (HIGH) (step S30). If there is no part which coincides with the data relating to forms of the prohibited masters, the specific image detection signal 116 is set to "0" (LOW) (step S32).

If both of the specific image change signal 115 and the specific image detection signal 116 are "1" (HIGH), the CPU 114 outputs a print correction signal 117 to the print-signal generator 105.

Print-Signal generator 105

Figure 6:
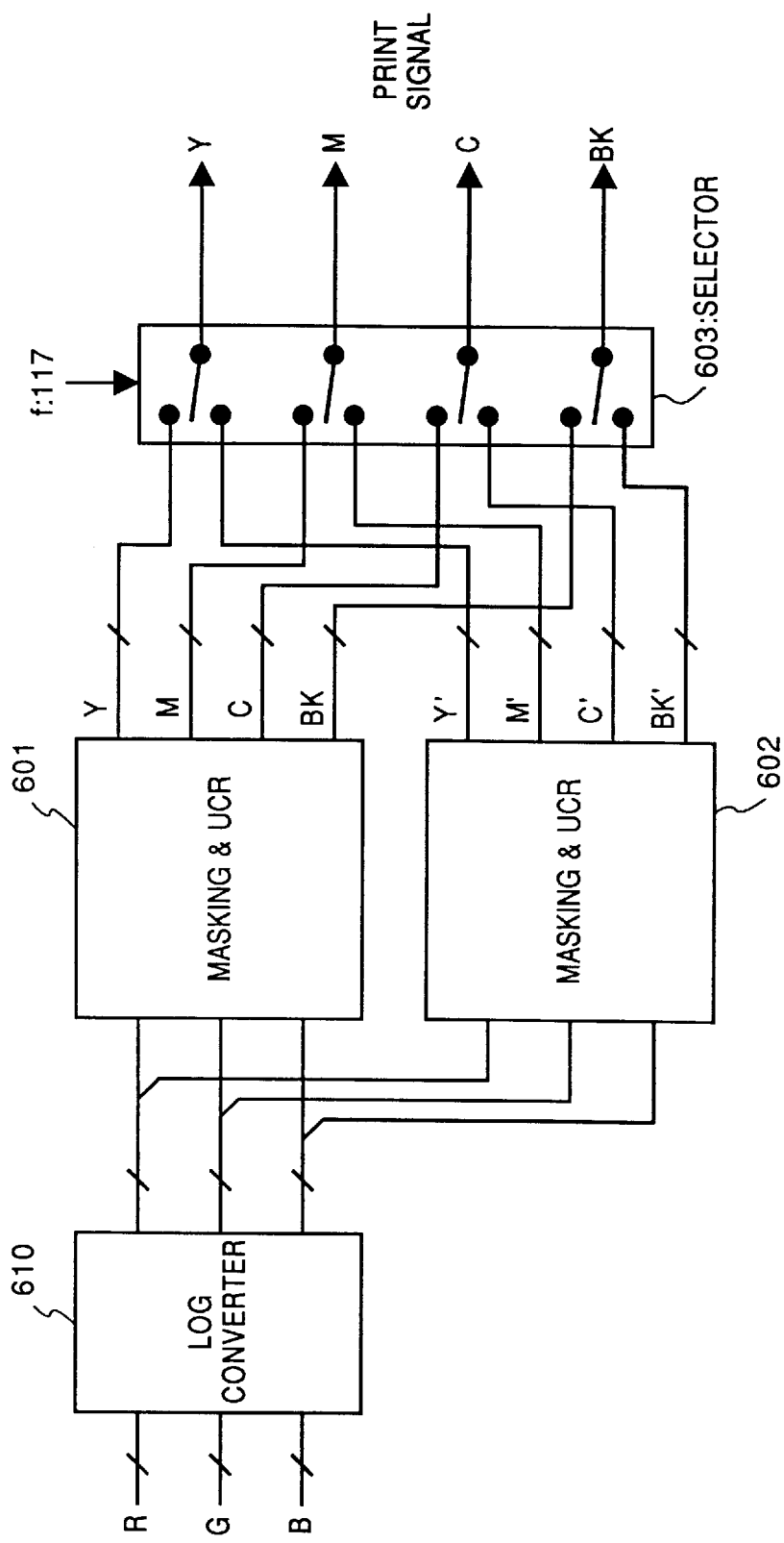
FIG. 6 is a block diagram showing the configuration of a print-signal generator 105 according to the first embodiment.

FIG. 6 is a block diagram showing the configuration of the print-signal generator 105 according to the first embodiment. In FIG. 6, numerals 601 and 602 denote masking-UCR circuits; 603, a selector; and 610, a LOG converter.

In the above construction, the masking-UCR circuit 601 generates a print-YMCKBk signals by RGB signals inputted on normal condition. If the input color signal is judged to coincide with the prohibited master, the masking-UCR circuit 602 generates YMCBk print-signals in which color and form are changed (e.g., redness is strengthened, or data is thinned).

As the selector 603 selects the output signals from the masking-UCR circuits 601 and 602 by the print correction signal 117, the color and the form of the data within only the area judged to coincide with the prohibited master can be processed and printed.

As described above, according to the first embodiment, the similarity between the input image and prohibited masters is discriminated per partitioned area employing discrimination by color and discrimination by pattern matching, thus, judgment of an area which has been difficult to be judged only by either of the above discriminations can be made, and more accurate discrimination between an ordinary image and a specific image is possible.

Second Embodiment

Next, a second embodiment will be described.

Figure 20:
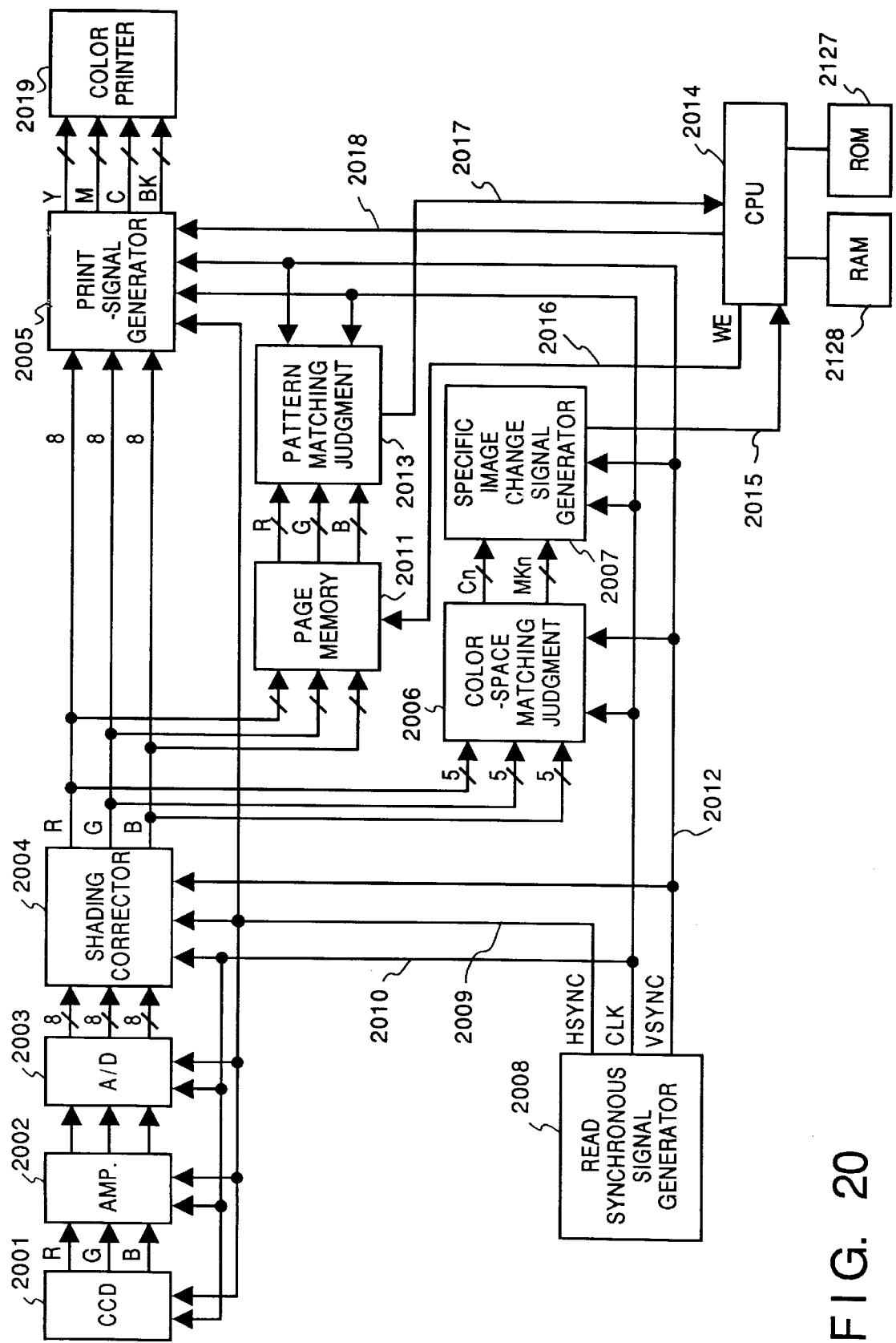
FIG. 20 is a block diagram showing the configuration of a color image reading apparatus according to a second embodiment.

FIG. 20 is a block diagram showing the configuration of a color image reading apparatus according to the second embodiment of the present invention. In FIG. 20, reference numeral 2001 denotes a color sensor comprising a CCD line sensor; 2002, an analog amplifier; 2003, an A/D converter; 2004, a shading corrector; 2005, a print-signal generator; 2006, a color-space matching judgment circuit; 2007, a specific image change signal generator; 2008, a read synchronous signal generator; 2013, a pattern matching judgment circuit; 2011, a page memory; 2014, a CPU; 2127, a ROM in which programs for operation of the CPU 2014 are stored; 2128, a RAM which is used as a work area for various programs; 2019, a color printer; 2009, a HSYNC; 2010, a CLK; 2012, a VSYNC; 2016, a WE; 2015, a specific image detection signal; 2017, a pattern matching judgment signal; and 2018, a print correction signal.

This embodiment of the above construction differs from the first embodiment in FIG. 1 in the point that the page memory 2011 is added. When writing becomes possible by the writing allowance signal WE 2016 from the CPU 2014, R, G and B signals from the shading corrector 2004 are inputted into the page memory 2011 and data of read original is stored there.

In the second embodiment, first, similarly to the first embodiment, color judgment in the RGB three-dimensional color-space between R, G and B signals from the shading corrector and prohibited masters is performed using the color-space matching judgment circuit 2006. If the signals coincide with color of the prohibited master, the color-space similarity judgment signal is set to "1" and is inputted into the specific image change signal generator 2007. If the specific image change signal generator 2007 judges that even one of a plurality of prohibited master data registered into the ROM in advance coincides with the observed image data in the color-space, the specific image change signal 2015 is set to "1" (HIGH) and inputted into the CPU 2014. When the CPU 2014 detects this specific image change signal 2015, the writing allowance signal WE 2016 for writing into the page memory 2011 becomes "0" (LOW) and the writing into the page memory 2011 ends.

Next, the pattern matching in this embodiment will be described.

Figure 21:
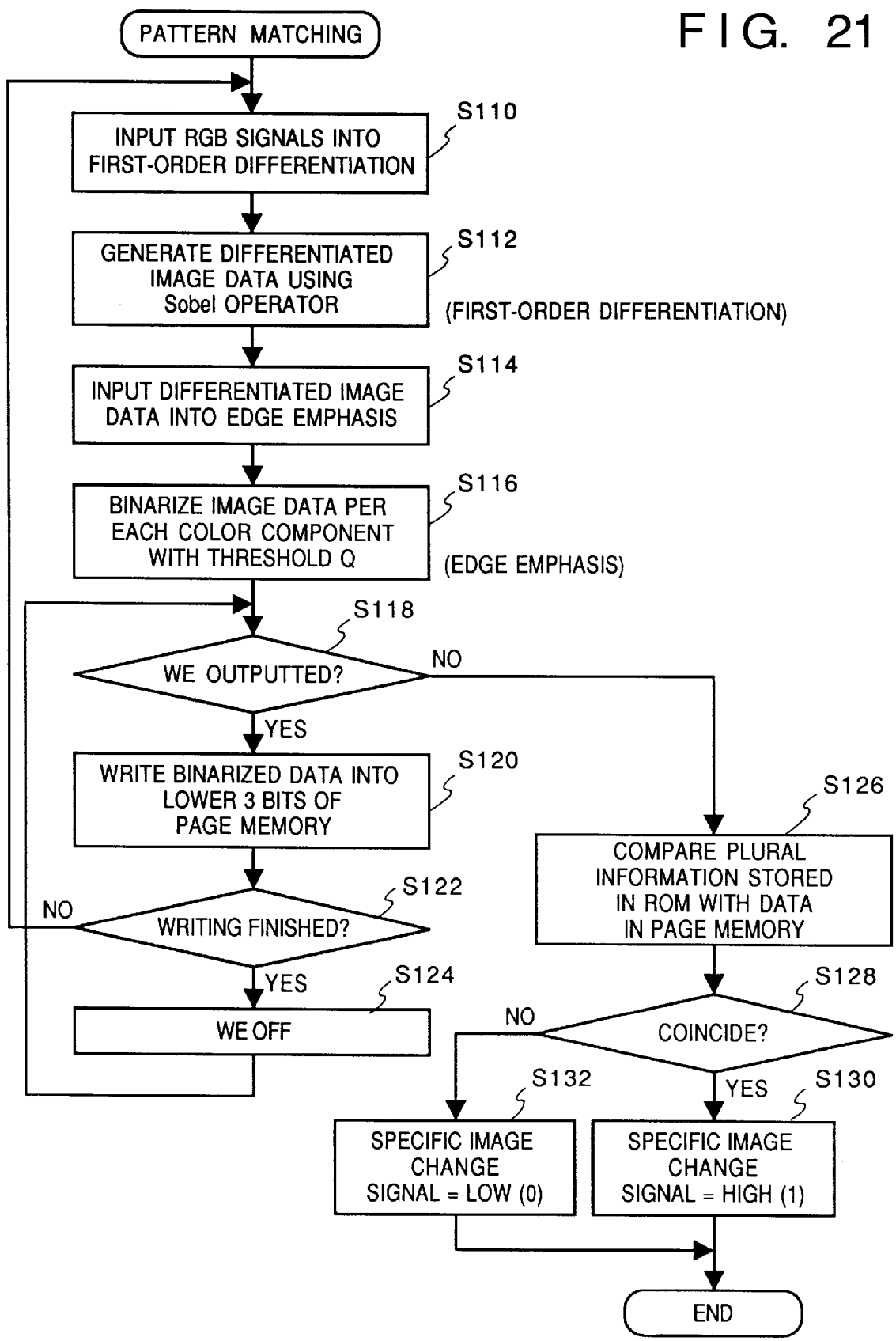
FIG. 21 is a flowchart explaining pattern matching operation according to the second embodiment.

FIG. 21 is a flowchart explaining pattern matching operation according to the second embodiment. It should be noted that the pattern matching judgment circuit 2013 corresponds to that in FIG. 16, therefore, the explanation of the configuration will be omitted.

First, the R, G and B signals stored in the page memory 2011 are inputted into a first-order differentiation circuit 1604 sequentially from the data which has been stored last (step S110). The primary differentiation circuit 1604 generates differentiated image data $D_R$, $D_G$ and $D_B$ using the Sobel operator as shown in FIG. 18 (step S112). The differentiated image data is inputted into an edge emphasis circuit 1605 (step S114), which converts (binarizes) image density into "0" or "1" per each color component by the aforementioned expression (3) with an appropriate threshold value $\theta$ as the border (step S116), and writes the binarized values into the respective corresponding addresses of the page memory 1606 in accordance with the format shown in FIG. 19 by the writing allowance signal WE 2016 from the CPU 2014 (steps S118 and S120). When the conversion in the above manner by the data which has been stored first in the page memory 2011 is finished, the writing allowance signal WE 2016 from the CPU 2014 becomes LOW (step S124), and the data in the page memory 1606 are compared with data relating to form of a plurality of prohibited masters stored in a ROM 1607 in the format in FIG. 19 (step S126). By this comparison, if even one part of the data in the page memory 1606 coincides with the data relating to the form of the prohibited masters (step S128), a specific image detection signal 2017 outputted to the CPU 2014 is set to "1" (HIGH) (step S130). If there is no part which coincides with the date relating to the form of the prohibited masters, the specific original image detection signal 2017 is set to "0" (LOW) (step S132).

If both of a specific image change signal 2015 and the specific image detection signal 2017 to be inputted into the CPU 2014 are "1" (HIGH), the CPU outputs a print change signal 2018 to the print-signal generation circuit 2005. Thus changing color or processing form data before printing can be performed only to the part of the data which coincides with the prohibited master.

It should be noted that, as an image output means of the present invention, a printer such as an ink-jet printer and a thermal transfer printer can be employed as well as the aforementioned laser-beam printer.

Further, as an input means of the present invention, a device such as a host computer, a video camera, a still-video camera, a film reader for color films can be employed as well as the image scanner which scans originals by a CCD sensor.

It should be noted that in the above-described first and second embodiments, the output destination is the color printer, however, the present invention is not limited to this arrangement, e.g., an external device such as a computer and a communication apparatus can be employed. In such case, a circuit for generating an output signal for the external device can be provided at one part of the print-signal generator.

It should be noted that the present invention may be applied to a system constituted by a plurality of apparatuses or to a single apparatus. It goes without saying that the present invention is applicable to a case where a program for implementing the invention is supplied to a system or apparatus.

As described above, according to the present invention, the discrimination between a specific image and an ordinary image can be performed accurately.

As many apparently widely different embodiments of the present invention can be made without departing from the spirit and scope thereof, it is to be understood that the invention is not limited to the specific embodiments thereof except as defined in the appended claims.

What is claimed is:

1. A controlling method for generating a control signal used for controlling an image processing apparatus which processes image data representing an image in synchronism with a synchronizing signal, the method comprising the steps of:

inputting the image data in synchronism with processing performed by said image processing apparatus;

a first judging step, performed by first judging means, for judging similarity between an image represented by the input image data and a specific original image by using a first judging method;

a second judging step, performed by second judging means which is independent of said first judging means, for judging similarity between the image represented by the input image data and the same specific original image as in said first judging step by using a second judging method which is different from the first judging method;

synchronizing said first and second judging means by using the synchronizing signal to provide a common timing signal for said first and second judging means;

determining similarity between the image represented by the input image data and the specific original image based on judgment results of said first and second judging steps; and outputting a determination result as the control signal, where the control signal controls image processing of the input image data by the image processing apparatus such that the image processing of the image processing apparatus is performed in parallel with said first and second judging steps and said determining step.

2. A controlling apparatus for generating a control signal used for controlling an image processing apparatus which processes image data representing an image in synchronism with a synchronizing signal, the apparatus comprising:

input means for inputting the image data in synchronism with processing performed by said image processing apparatus;

first judgment means for judging similarity between an image represented by the image data input by said input means and a specific original image by using a first judging method;

second judgment means for judging similarity between the image represented by the image data input by said input means and the specific original image by using a second judging method which is different from the first judging method; and determination means for determining similarity between the image represented by the image data input by said input means and the specific original image based on judgment results by said first and second judgment means, and for outputting a determination result, wherein the first and second judgment means are arranged independently of each other and perform judging on the same specific original image and on the same image data; and wherein the synchronizing signal provides a common timing signal to synchronize said first and second judgment means in order to output the determination result as the control signal, where the control signal controls image processing of the input image data by the image processing apparatus such that the image processing of the image processing apparatus is performed in parallel with judging by said first and second judging means and determining by said determination means.

3. The image processing apparatus according to claim 2, wherein said first judgment means judges the similarity based on color-space information.

4. The image processing apparatus according to claim 3, wherein the color-space is R (Red)-G (Green)-B (Blue) three-dimensional color-space.

5. The image processing apparatus according to claim 2, wherein said second judgment means judges the similarity based on pattern information.

6. The image processing apparatus according to claim 5, wherein the image data represents an original image; and wherein said second judgment means comprises:
pattern extracting means for extracting pattern data from the original image; and
pattern comparison means for comparing the extracted pattern data with pattern data of the specific original image which has been stored in advance.

7. The image processing apparatus according to claim 6, wherein said pattern extracting means extracts pattern data at a predetermined position on the original image, and said pattern comparison means compares the pattern data at the predetermined position of the original image with pattern data for the specific original image.

8. The image processing apparatus according to claim 6, wherein said pattern comparison means outputs a signal indicating pattern similarity if at least one part of the original image is similar to a corresponding part of the specific original image.

9. The image processing apparatus according to claim 2, wherein, if both of said first and second judgment means judge that the image is similar to the specific original image, said determination means determines that the image is similar to the specific original image.

10. The image processing apparatus according to claim 2, further comprising judgment control means for, if either one of said first and second judgment means judges that the image is similar to the specific original image, performing judgment using the other judgment means based on the input image data.

11. The image processing apparatus according to claim 2, wherein said first judgment means judges similarity based on color-space information; and wherein said second judgment means judges the similarity based on pattern information, said apparatus further comprising judgment control means for, if said first judgment means judges that the image is similar to the specific original image, performing judgment using said second judgment means based on the input image data.

12. An original image judgment method for generating a control signal used for controlling an image processing apparatus which processes image data representing an image in synchronism with a synchronizing signal, the method comprising the steps of:

inputting image data in synchronism with processing performed by said image processing apparatus;

extracting color-space information from the image data;

a first obtaining step for obtaining a first comparison result by comparing the extracted color-space information with color-space information of a specific original;

extracting pattern information from the image data;

a second obtaining step for obtaining a second comparison result by comparing the extracted pattern information with pattern information of the specific original; and judging similarity between the original image and the specific original based on the first comparison result of the color-space information and the second comparison result of the pattern information, wherein the extracted color-space information and the extracted pattern information are compared to the same specific original, wherein the first and second comparison results are obtained from the same original image by respective first and second judgment means arranged independently of each other, and wherein said first and second obtaining steps are performed at the same time as said step of inputting image data in order to output a judgment result from the judging step as the control signal, where the control signal controls image processing of the image data by the image processing apparatus such that the image processing of the image processing apparatus is performed in parallel with said first and second obtaining steps and said judging step.

13. The judgment method according to claim 12, wherein the color-space is RGB three-dimensional color-space.

14. The judgment method according to claim 12, wherein in the pattern information comparison step, pattern data at a predetermined position of the image is compared to pattern data at a corresponding position of the specific original image.

15. The judgment method according to claim 12, wherein in the pattern information comparison step, if one part of the original image is similar to a corresponding part of the specific original image, a comparison result indicating similarity of patterns is output.

16. The judgment method according to claim 12, further comprising performing the pattern information comparison step using the input image data in a case that the first comparison result indicates that the image is similar to the specific image.

17. A controlling method for generating a control signal used for controlling an image processing apparatus which processes image data representing an image, the method comprising the steps of:

inputting the image data in synchronism with processing performed by said image processing apparatus;

a first judging step, performed by first judging means, for judging similarity between an image represented by the input image data and a specific original image by using a first judging method;

a second judging step, performed by second judging means which is independent of said first judging means, for judging similarity between the image represented by the input image data and a specific original image by using a second judging method which is different from the first judging method;

determining similarity between the image represented by the input image data and the specific original image based on judgment results of said first and second judging steps; and outputting a determination result as the control signal, wherein the control signal controls image processing of the input image data by the image processing apparatus such that the image processing of the image processing apparatus is performed in parallel with said first and second judging steps and said determining step.

18. A method according to claim 17, wherein said first judging method is a color matching method.

19. A method according to claim 17, wherein said second judging method is a pattern matching method.

20. A method according to claim 17, wherein said image processing apparatus is a color copy machine.

21. A method according to claim 17, wherein said control signal switches image processing performed in accordance with said image data.

22. A method according to claim 17, wherein said control signal controls whether or not to process said image data.

23. A method according to claim 17, wherein said inputting of the image data is performed by an image scanner.

24. A method according to claim 17, wherein said image processing apparatus is an apparatus forming an image in accordance with said image data by using a laser beam.

25. A method according to claim 17, wherein said image processing apparatus is an apparatus forming an image in accordance with said image data by using an ink.

26. A controlling apparatus for generating a control signal used for controlling an image processing apparatus which processes image data representing an image, the apparatus comprising:

input means for inputting the image data in synchronism with processing performed by said image processing apparatus;

first judging means for judging similarity between an image represented by the input image data and a specific original image by using a first judging method;

second judging means, which is independent of said first judging means, for judging similarity between the image represented by the input image data and a specific original image by using a second judging method which is different from the first judging method;

determination means for determining similarity between the image represented by the input image data and the specific original image based on judgment results of said first and second judging means; and output means for outputting a determination result as the control signal, where the control signal controls image processing of the input image data by the image processing apparatus such that the image processing of the image processing apparatus is performed in parallel with said first and second judging methods and the similarity determination.

27. An apparatus according to claim 26, wherein said first judging method is a color matching method.

28. An apparatus according to claim 26, wherein said second judging method is a pattern matching method.

29. An apparatus according to claim 26, wherein said image processing apparatus is a color copy machine.

30. An apparatus according to claim 26, wherein said control signal switches image processing performed in accordance with said image data.

31. An apparatus according to claim 26, wherein said control signal controls whether or not to process said image data.

32. An apparatus according to claim 26, wherein said inputting means is an image scanner.

33. An apparatus according to claim 26, wherein said image processing apparatus is an apparatus forming an image in accordance with said image data by using a laser beam.

34. An apparatus according to claim 26, wherein said image processing apparatus is an apparatus forming an image in accordance with said image data by using an ink.

* * * * *

UNITED STATES PATENT AND TRADEMARK OFFICE
CERTIFICATE OF CORRECTION

PATENT NO. : 5,828,777

DATED : October 27, 1998

INVENTOR : AKIO SUZUKI

It is certified that error appears in the above-identified patent and that said Letters Patent is hereby corrected as shown below:

On the title page,

Item [54] and Col. 1. the Title is misspelled and should read --IMAGE PROCESSING METHOD AND APPARATUS FOR PREVENTING COPYING OF SPECIFIED DOCUMENTS--.

COLUMN 5

Line 20, "UORG" should read --$U_{ORG}$--.

Signed and Sealed this

Eighth Day of June, 1999

*Attest:*

Q. TODD DICKINSON

*Attesting Officer*     Acting Commissioner of Patents and Trademarks

UNITED STATES PATENT AND TRADEMARK OFFICE
CERTIFICATE OF CORRECTION

PATENT NO. : 5,828,777  
DATED : Oct. 27, 1998  
INVENTOR(S) : Suzuki

Page 1 of 3

It is certified that error appears in the above-identified patent and that said Letters Patent is hereby corrected as shown below:

On the title page, Item [54]Title, and Column 1, line 2, should be deleted to be replaced with the attached title page.

Column 5, line 20, "UORG" should read -- $U_{ORG}$ --.

Signed and Sealed this

Thirteenth Day of July, 1999

Attest:

Q. TODD DICKINSON

Attesting Officer

Acting Commissioner of Patents and Trademarks

United States Patent
Suzuki

[11] Patent Number: 5,828,777
[45] Date of Patent: Oct. 27, 1998

[54] IMAGE PROCESSING METHOD AND APPARATUS FOR PREVENTING COPYING OF SPECIFIED DOCUMENTS

[75] Inventor: Akio Suzuki, Tokyo, Japan

[73] Assignee: Canon Kabushiki Kaisha, Tokyo, Japan

[21] Appl. No.: 440,318

[22] Filed: May 12, 1995

Related U.S. Application Data

[63] Continuation of Ser. No. 22,626, Feb. 25, 1993, abandoned.

[30] Foreign Application Priority Data

Feb. 28, 1992 [JP] Japan ................................ 4-043893

[51] Int. Cl.[6] ................................................... G06K 9/68
[52] U.S. Cl. ........................ 382/135; 382/227; 382/165; 358/515; 355/201
[58] Field of Search ........................ 355/201; 382/135, 382/137, 165, 191, 227, 309, 310; 358/504, 515, 518, 522

[56] References Cited

U.S. PATENT DOCUMENTS

| | | | |
|---|---|---|---|
| 4,466,122 | 8/1984 | Auerbach | 382/17 |
| 4,991,223 | 2/1991 | Bradley | 382/17 |
| 5,216,724 | 6/1993 | Suzuki et al | 382/7 |
| 5,227,871 | 7/1993 | Funada et al | 382/7 |
| 5,257,119 | 10/1993 | Funada et al | 358/438 |
| 5,257,323 | 10/1993 | Melen et al | 382/310 |
| 5,321,470 | 6/1994 | Hasuo et al | 355/201 |
| 5,363,202 | 11/1994 | Udagawa et al | 358/501 |
| 5,363,454 | 11/1994 | Udagawa et al | 382/17 |

FOREIGN PATENT DOCUMENTS

| | | | |
|---|---|---|---|
| 0342060 | 11/1989 | European Pat. Off. | G03G 21/00 |
| 0488796 | 6/1992 | European Pat. Off. | G03G 21/00 |
| 512411 | 1/1993 | Japan | G06F 15/62 |

*Primary Examiner*—Leo Boudreau
*Assistant Examiner*—Christopher S. Kelley
*Attorney, Agent, or Firm*—Fitzpatrick, Cella, Harper & Scinto

[57] ABSTRACT

An image processing apparatus for performing accurate discrimination between specific originals and ordinary originals. CCD 101 inputs RGB signals, and color-space matching judgment circuit 106 and pattern matching judgment circuit 113 judge the similarity in the color distribution and pattern between the input RGB data and a predetermined specific image data. CPU 114 judges the similarity and print-signal generator 105 generates a change signal in accordance with the judged similarity. The input RGB signals are changed based on the generated change signal and outputted to external color printer 111.

34 Claims, 19 Drawing Sheets

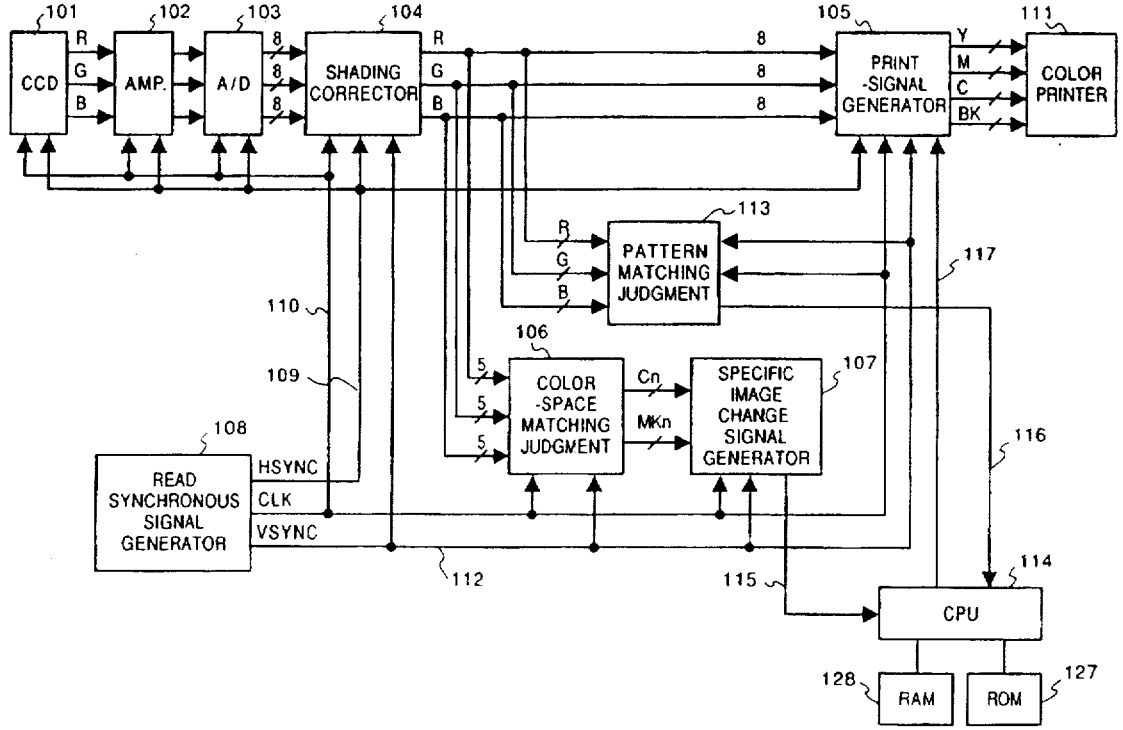

IMAGE PROCESSING METHOD AND APPARATUS FOR PREVENTING COPYING OF SPECIFIED DOCUMENTS

This application is a continuation of application Ser. No. 08/022,626 filed Feb. 25, 1993, now abandoned.

BACKGROUND OF THE INVENTION

The present invention relates to an image processing method and apparatus, e.g., to an image processing method and apparatus having a function for discriminating a specific original.

Related Arts

In recent years, the reproductivity of an original has improved along with the development of copying machines. For this reason, technique for preventing copying originals which should not be copied such as bank notes and securities is needed. As one of such technique, the applicant of the present invention has proposed, U.S. Ser. No. 715,922 filed Jun. 14, 1991, now U.S. Pat. No. 5,122,165 discrimination of specific originals by pre-registering data of specific originals in color-space and judging whether or not the distribution of the input original image data in color-space approximately coincides with the distribution of specific original data. In addition, as a state of this art, technique of performing the above discrimination by predetermined area of an input image has been proposed as Japanese Patent Application No. 3-160385.

However, originals which are difficult to discriminate, by using the above conventional techniques only, whether they are specific originals or ordinary originals have been increased.

SUMMARY OF THE INVENTION

The present invention has been made in view of the drawback of the aforementioned prior arts, and has as its object to provide an image processing method and apparatus for performing accurate discrimination between specific originals and ordinary originals.

Another object of the present invention is to provide an image processing method and apparatus for performing better discrimination by employing at least two discriminating methods.

Further object of the present invention is to provide an image processing method and apparatus for reducing discrimination process and performing accurate discrimination.

Another object of the present invention is to provide an image processing method and apparatus for changing only the part of an input original similar to a pre-registered specific original.

Other features and advantages of the present invention will be apparent from the following description taken in conjunction with the accompanying drawing, in which like reference characters designate the same or similar parts throughout the figures thereof.

BRIEF DESCRIPTION OF THE DRAWINGS

The accompanying drawing, which are incorporated in and constitute a part of the specification, illustrate embodiments of the invention and, together with the description, serve to explain the principles of the invention.

FIG. 1 is a block diagram showing the configuration of a color image reading apparatus according to the first embodiment of the present invention;

FIG. 2 is a block diagram showing the configuration of a color-space matching judgment circuit 106 according to the first embodiment;

FIG. 3 is a logic diagram showing the configuration of a color-space judgment circuit according to the first embodiment;

FIG. 4 is a timing diagram showing the relation between reading and writing of data from/to a SRAM 209 in the first embodiment;

FIG. 5 is a logic diagram showing the configuration of a specific image change signal generator 107 according to the first embodiment;

FIG. 6 is a block diagram showing the configuration of a print-signal generator 105 according to the first embodiment;

FIG. 7 is a block diagram showing the configuration of the smoothing circuits 220–227 according to the first embodiment;

FIGS. 8A and 8B are diagrams showing the relation between input Xi and smoothed value Yi in the first embodiment;

FIG. 9 is a diagram showing the relation between the shape of data obtained from a specific original in the color-space and data in a ROM in the first embodiment;

FIG. 10 is a diagram showing the relation between the position of a specific original on a platen and its recognition zone;

FIG. 11 is a diagram showing the distribution of data obtained from a specific original A in the RGB three-dimensional space in the first embodiment;

FIG. 12 is a diagram showing the distribution of data obtained from a specific original B in the RGB three-dimensional color-space in the first embodiment;

FIG. 13 is a diagram showing the relation between data relating to colors obtained from the plurality of originals A–H stored in the ROM 204 and bit positions in the ROM 204 in the first embodiment;

FIG. 14 is a conceptualized view showing the comparison between image data obtained from specific original and input original image data in the three-dimensional color-space in the first embodiment;

FIG. 15 is a diagram showing the relation between a color-space matching process area signal CCL 281 and partitioned areas on the platen in the first embodiment;

FIG. 16 is a block diagram showing the configuration of a pattern matching judgment circuit 113 according to the first embodiment;

FIG. 17 is a flowchart explaining pattern matching operation according to the first embodiment;

FIG. 18 is a diagram showing a Sobel operator used in a first-order differentiation circuit;

FIG. 19 is a diagram showing a data format for writing data into a page memory in the first embodiment;

FIG. 20 is a block diagram showing the configuration of a color image reading apparatus according to a second embodiment; and FIG. 21 is a flowchart explaining pattern matching operation according to the second embodiment.

DETAILED DESCRIPTION OF THE PREFERRED EMBODIMENT(S)

Preferred embodiments of the present invention will be described in detail with reference to the attached drawings.

UNITED STATES PATENT AND TRADEMARK OFFICE
CERTIFICATE OF CORRECTION

PATENT NO. : 5,828,777

DATED : October 27, 1998

INVENTOR : AKIO SUZUKI

It is certified that error appears in the above-identified patent and that said Letters Patent is hereby corrected as shown below:

<u>COVER PAGE</u>

Please insert --[*] Notice: This patent issued on a continued prosecution application filed under 37 C.F.R. 1.53(d), and is subject to the twenty year patent term provisions of 35 U.S.C. 1.54(a)(2).--

Signed and Sealed this

Twenty-third Day of May, 2000

Attest:

Q. TODD DICKINSON

Attesting Officer          Director of Patents and Trademarks